United States Patent
Larkin et al.

(10) Patent No.: US 8,368,751 B2
(45) Date of Patent: Feb. 5, 2013

(54) MEASURE DISPLAY SFR USING A CAMERA AND PHASE SHIFTING

(75) Inventors: Kieran Gerard Larkin, Putney (AU); Donald James Bone, Castle Hill (AU)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 12/629,265

(22) Filed: Dec. 2, 2009

(65) Prior Publication Data

US 2010/0157047 A1     Jun. 24, 2010

(30) Foreign Application Priority Data

Dec. 19, 2008   (AU) ................. 2008261138

(51) Int. Cl.
- *H04N 7/18* (2006.01)
- *H04N 5/228* (2006.01)
- *G01M 11/00* (2006.01)

(52) U.S. Cl. .................. 348/135; 348/208.4; 356/124.5

(58) Field of Classification Search ........................ None
See application file for complete search history.

(56) References Cited

U.S. PATENT DOCUMENTS

| | | | |
|---|---|---|---|
| 3,657,550 A * | 4/1972 | Brown et al. | 250/549 |
| 4,680,639 A * | 7/1987 | Isono et al. | 348/629 |
| 5,600,432 A * | 2/1997 | Lengyel et al. | 356/124.5 |
| 5,629,766 A | 5/1997 | Kaplan | |
| 6,466,225 B1 | 10/2002 | Larkin et al. | |
| 6,888,566 B2 | 5/2005 | Larkin et al. | |
| 2007/0266287 A1 | 11/2007 | Liu | |

FOREIGN PATENT DOCUMENTS

| | | |
|---|---|---|
| AU | 2005203031 A1 | 2/2007 |
| WO | 97/09598 A1 | 3/1997 |

OTHER PUBLICATIONS

Aug. 17, 2010 Examiner's First Report in Australian Patent Appln. No. 2008261138.
M. Dirk Robinson, et al., "End-to-End Compensation of Digital-Optical Imaging Systems", Proceedings of SPIE, vol. 6288; Aug. 31, 2006; pp. 1-12.
Aug. 9, 2011 Notice of Acceptance in Australian Patent Appln. No. 2008261138.
S. Triantaphillidou et al., "Measurements of the Modulation Transfer Function of Image Displays", Journal of Imaging Science and Technology, vol. 48, No. 1, Jan./Feb. 2004, pp. 58-65.
John E. Greivenkamp et al., "Modulation transfer function measurement of sparse-array sensors using a self-calibrating fringe pattern", Applied Optics, vol. 33, No. 22, Aug. 1994, pp. 5029-5036.

\* cited by examiner

*Primary Examiner* — Wen-Tai Lin
(74) *Attorney, Agent, or Firm* — Fitzpatrick, Cella, Harper & Scinto

(57) ABSTRACT

A method for measuring the spatial frequency response (SFR) of an imaging system (299) including a display device (280) and an image capture device (290) is disclosed. The method displays a sequence of displayable test pattern images on the display device, the sequence comprising a first test pattern image and at least two subsequent test pattern images, each of the displayable test pattern images including a test pattern having at least one sinusoidal pattern at one or more spatial frequencies such that a phase shift of the sinusoidal pattern has a plurality of pre-determined values. The displayed images are captured with the image capture device to generate a corresponding sequence of captured test pattern images. The captured test pattern images are then compared with the displayable test pattern images to calculate the SFR at a plurality of image locations in the imaging system at the one or more spatial frequencies.

14 Claims, 16 Drawing Sheets

MEASURE DISPLAY SFR USING A CAMERA AND PHASE SHIFTING

CROSS-REFERENCE TO RELATED PATENT APPLICATIONS

This application claims the right of priority under 35 U.S.C. §119 based on Australian Patent Application No. 2008261138, filed Dec. 19, 2008, which is incorporated by reference herein in its entirety as if fully set forth herein.

TECHNICAL FIELD

The present invention relates generally to optical measurement systems and, more particularly, to a method for measuring the spatial frequency response of an imaging system using phase shifting.

BACKGROUND

An imaging system consists of a device, or a group of devices, that captures or displays an image of a subject or object. Common forms of imaging systems include televisions, computer monitors and digital cameras.

The spatial frequency response (SFR) of an imaging system is a measure of the ability of the system to capture or reproduce the spatial details of an object. This can take a number of specific forms. For a spatially invariant imaging system, one commonly used form of spatial frequency response measure is the 'optical transfer function' (OTF). The OTF can be calculated as the Fourier transform of the point spread function (PSF), sometimes known as the impulse response function. The OTF is complex, consisting of a magnitude part (the modulation transfer function) and a phase part (the phase transfer function). The modulus of the OTF, called the modulation transfer function (MTF), is a measure of the effectiveness with which a device captures or represents different spatial frequencies without regard to any phase shifts that the system produces. This is often used instead of the OTF since it is easier to measure.

It is known that the MTF of an imaging system can be measured using a sine wave test pattern. The Fourier transform of the measured sine wave is calculated from a region of the test pattern, and the modulation amplitude is compared to the modulation amplitude of the input sine wave to calculate the modulation transfer function. However this approach relies on the imaging system being spatially invariant since the calculation of the MTF must use information from an extended region of the test pattern.

More commonly, MTF is measured using test patterns consisting of geometric shapes with high contrast sharp edges. This produces a measurement of the edge spread function (ESF). The gradient of the ESF normal to the edge gives the line spread function (LSF). The Fourier transform of the LSF is computed to obtain the MTF. However this approach also relies on the imaging system being spatially invariant since the calculation of the MTF must use information from an extended region of the test pattern.

If a system is not spatially invariant, which is often the case for real systems, then the OTF and MTF are not strictly defined. In the past, this situation has been handled only if the system is approximately spatially invariant over some local region. The OTF is then determined locally assuming spatial invariance over the region analysed, but the analysis requires relatively large regions to achieve accurate results. It is therefore only possible to determine the SFR at a limited number of locations and it is likely to be affected by any deviation from the assumed spatial invariance. What is desired is a spatially variable measure of SFR and a method whereby measurements can be made locally at a single point.

SUMMARY

The presently disclosed arrangements address the disadvantages of the prior art by providing a method that measures the spatial frequency response of an imaging system using data taken from a single location in the imaging system. Furthermore the arrangements can recover both the magnitude and the phase of the SFR. If the imaging system is approximately spatially invariant, then the presently disclosed arrangements can take advantage of this to use data from an extended region, so as to reduce sensitivity to noise in the imaging system.

The present arrangements use a display device to display test patterns and an image capture device to capture the displayed patterns. These can be consumer grade devices. The SFR is measured of either the camera or display device or the combination of a camera and a display device. A group of test patterns with pre-determined or otherwise known properties are shown on a display device. The test patterns on the display device are captured by an image capture device and compared to the raw test patterns or the pre-determined properties of the raw test patterns to calculate the SFR of the system at one or more locations in the imaging system. The predetermined properties of the raw test patterns are comprised of the amplitudes, phase shifts and frequencies of the significant spatial frequency components in the raw test pattern.

In accordance with one aspect of the present disclosure, there is provided a method for measuring the spatial frequency response (SFR) of an imaging system including a display device and an image capture device, said method comprising the steps of:

displaying a sequence of displayable test pattern images on the display device, the sequence comprising a first test pattern image and at least two subsequent test pattern images, each of the displayable test pattern images including a test pattern having at least one sinusoidal pattern at one or more spatial frequencies such that a phase shift of the sinusoidal pattern has a plurality of pre-determined values;

capturing the displayed images with the image capture device to generate a corresponding sequence of captured test pattern images; and comparing the captured test pattern images with the displayable test pattern images to calculate the SFR at a plurality of image locations in said imaging system at the one or more spatial frequencies.

Other aspects are disclosed.

BRIEF DESCRIPTION OF THE DRAWINGS

At least one embodiment of the present invention will now be described with reference to the following drawings, in which.

DETAILED DESCRIPTION INCLUDING BEST MODE

Figure 1:
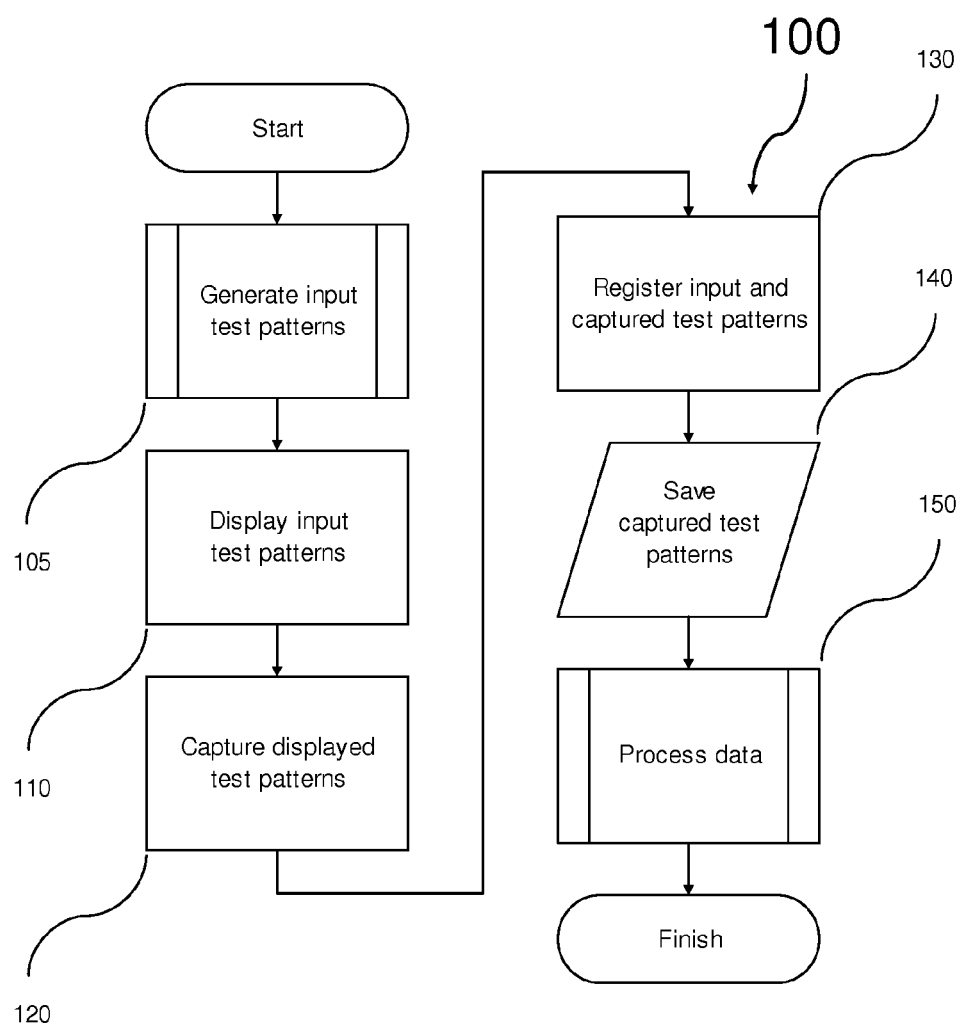
FIG. 1 is a schematic flow diagram illustrating the procedure for measuring spatial frequency response using phase shifting.

FIG. 1 is a schematic flow diagram of a SFR measurement method 100 able to be performed in a measurement system. The method 100 shows a first step 105 that generates input test patterns, and a second step 110 that displays input test patterns in a predefined sequence. The next step 120 captures images of the displayed test patterns, and a following step 130 registers the input and captured test patterns. A step 140 then outputs the captured test patterns to a step 150 that processes the captured test patterns to determine the SFR of the imaging system.

Figure 2A:
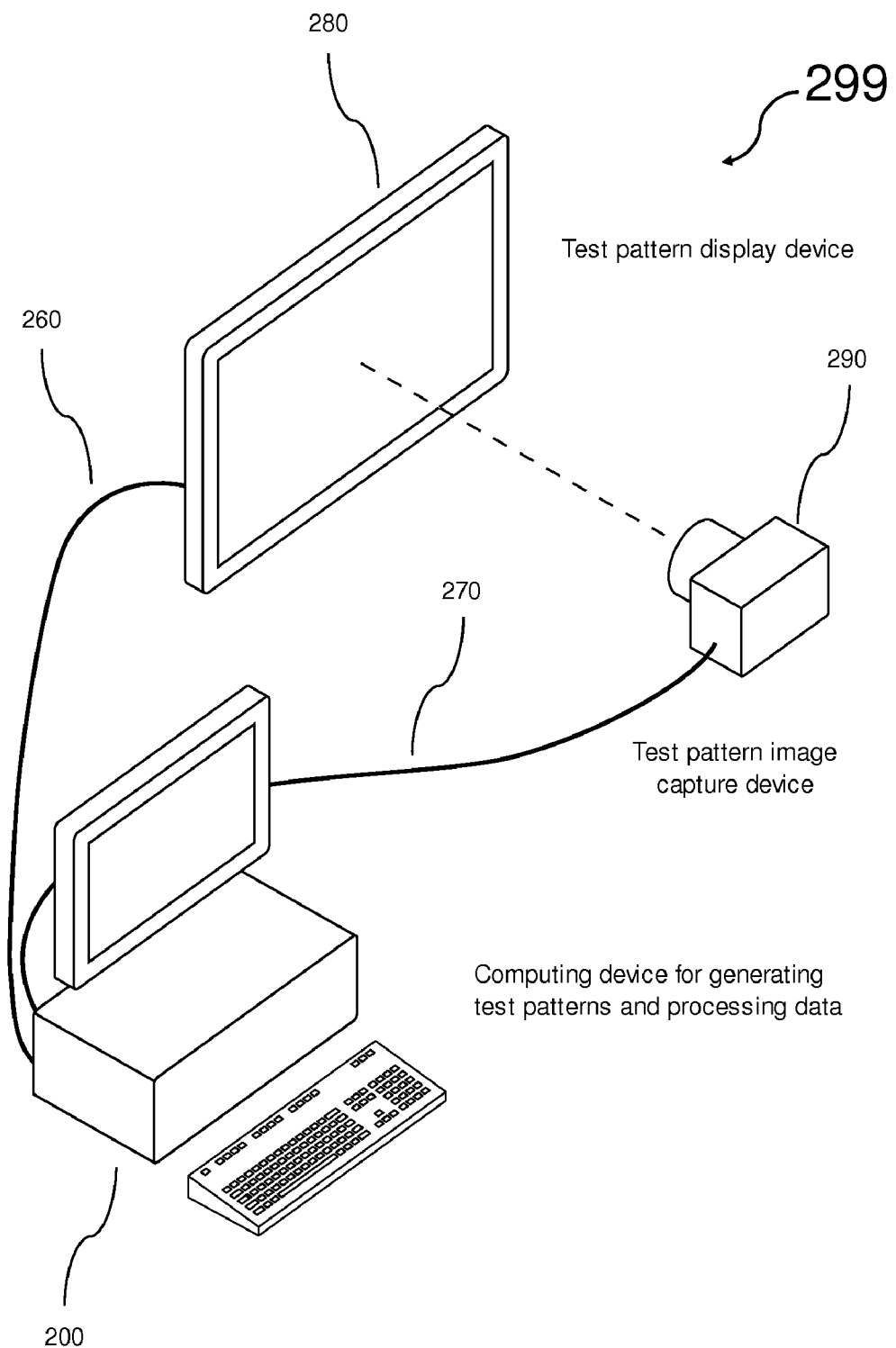
FIG. 2A is a schematic diagram of the physical setup of a Spatial Frequency Response measurement system according to the present disclosure.

A system 299 for the SFR measurements is shown in FIG. 2A. The system 299 includes a computing device 200 which contains means for performing each of the steps 105-150, a connection 260 for transmitting the test patterns from the computer 200 to a display device 280 upon which the test patterns are displayable, an image capture device 290 for capturing an image of each displayed test pattern, and a connection 270 for transmitting the captured test pattern images back to the computing device 200 for data processing according to step 150. The connections 260 and 270 may be wired or wireless, such as infrared or radio frequency communication links.

Figure 2B:
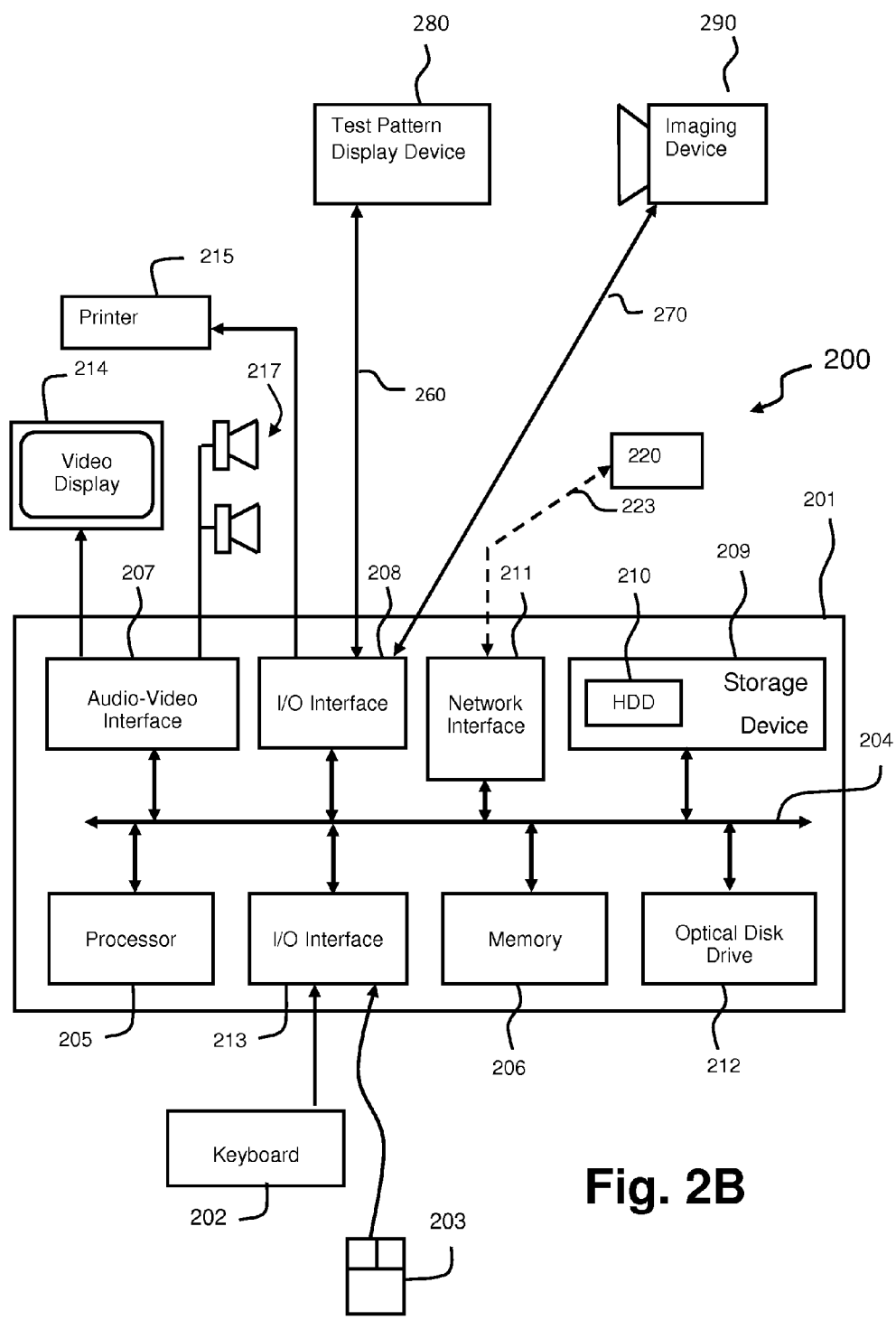
FIG. 2B is a schematic diagram of the computer system of the system of FIG. 2A.

FIG. 2B illustrates schematically the system 299 in which the processes of FIGS. 1 and 4 to 12 may be implemented as software, such as one or more application programs executable within the computer system 200. In particular, the method of SFR determination is effected by instructions in the software that are carried out within the computer system 200. The instructions may be formed as one or more code modules, each for performing one or more particular tasks. The software may also be divided into two separate parts, in which a first part and the corresponding code modules performs the SFR measurement methods and a second part and the corresponding code modules manage a user interface between the first part and the user. The software may be stored in a computer readable medium, including the storage devices described below, for example. The software is loaded into the computer system 200 from the computer readable medium, and then executed by the computer system 200. A computer readable medium having such software or computer program recorded on it is a computer program product. The use of the computer program product in the computer system 200 preferably effects an advantageous apparatus for SFR measurements.

As seen in FIG. 2B, the computer system 200 is formed by a computer module 201, input devices such as a keyboard 202 and a mouse pointer device 203, and output devices including a printer 215, a display device 214 and loudspeakers 217. A connection 223 is typically provided so the computer module 201 may communicate to and from a communications network 220. The network 220 may be a wide-area network (WAN), such as the Internet or a private WAN, or a Local Area Network (LAN).

The computer module 201 typically includes at least one processor unit 205, and a memory unit 206 for example formed from semiconductor random access memory (RAM) and read only memory (ROM). The module 201 also includes a number of input/output (I/O) interfaces including an audio-video interface 207 that couples to the video display 214 and loudspeakers 217, an I/O interface 213 for the keyboard 202 and mouse 203 and optionally a joystick (not illustrated), and an interface 208 for the printer 215, and by which the connections 260 and 270 couple to the test pattern display device 280 and the imaging device 290 respectively. The computer module 201 also has a local network interface 211 which, via the connection 223, permits coupling of the computer system 200 to the network 220. The connection 223 may be a telephone line, in which case the interface may be may be a traditional "dial-up" modem. Alternatively, where the connection 223 is a high capacity (e.g., cable) connection, the interface 211 may be a broadband modem. A wireless modem may also be used for wireless connection to the network 220. The interface 211 may be formed by an Ethernet™ circuit card, a wireless Bluetooth™ or an IEEE 802.11 wireless arrangement.

The interfaces 208 and 213 may afford both serial and parallel connectivity, the former typically being implemented according to the Universal Serial Bus (USB) standards and having corresponding USB connectors (not illustrated). Storage devices 209 are provided and typically include a hard disk drive (HDD) 210. Other devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD), USB-RAM, and floppy disks for example may then be used as appropriate sources of data to the system 200.

The components 205 to 213 of the computer module 201 typically communicate via an interconnected bus 204 and in a manner which results in a conventional mode of operation of the computer system 200 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 210 and read and controlled in execution by the processor 205. Intermediate storage of such programs and any data fetched from the network 220 may be accomplished using the semiconductor memory 206, possibly in concert with the hard disk drive 210. In some instances, the application programs may be supplied to the user encoded on one or more CD-ROM and read via the corresponding drive 212, or alternatively may be read by the user from the networks 220 or 222. Still further, the software can also be loaded into the computer system 200 from other computer readable media. Computer readable storage media refers to any storage medium that participates in providing instructions and/or data to the computer system 200 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 201. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 214. Through manipulation of the keyboard 202 and the mouse 203, a user of the computer system 200 and the applications may manipulate the interface to provide controlling commands and/or input to the applications associated with the GUI(s).

In general, both the test pattern display device 280 and the image capture device 290 can affect the SFR of the system 299. However if the SFR of one of the devices 280, 290 is known, then the presently disclosed arrangements can be used to measure the SFR of the whole system and then the effect of the SFR of the known device can be removed from the whole system SFR to reveal the SFR of the unknown device. In the system 299, the display 214 is that typically upon which any GUI is displayed for control of SFR measurements of the test pattern display device 280. This may be the case in a manufacturing plant where the display 280 forms a "device-under-test", and the imaging device (camera) 290 has known parameters, including SFR values and the display 280 is conveyed in a production line scenario. Alternatively, where the imaging device 290 is the device under test and the display device 280 is fixed with known SFR parameters, the display 214 could be omitted and any GUIs display on the device 280.

In general, both the test pattern display device 280 and the test pattern image capture device 290 will have gain defects that could interfere with the SFR measurement, and thus should be measured and corrected. These defects can be measured and corrected independently of the SFR measurement using well known methods. For the purposes of the present disclosure, it is possible to simply assume that the gain defects in the test pattern display device 280 and the image capture device 290 have been independently measured and corrected. However, in practice, real devices will not have been corrected and it is instructive to those seeking to implement the present method of SFR measurement to understand how this can be achieved without having a significant impact on the SFR measurement. To limit the complexity of the description, it is assumed that the image capture device 290 has been independently measured and incorporates corrections to effectively remove the effects of the gain defects in that device.

Figure 3:
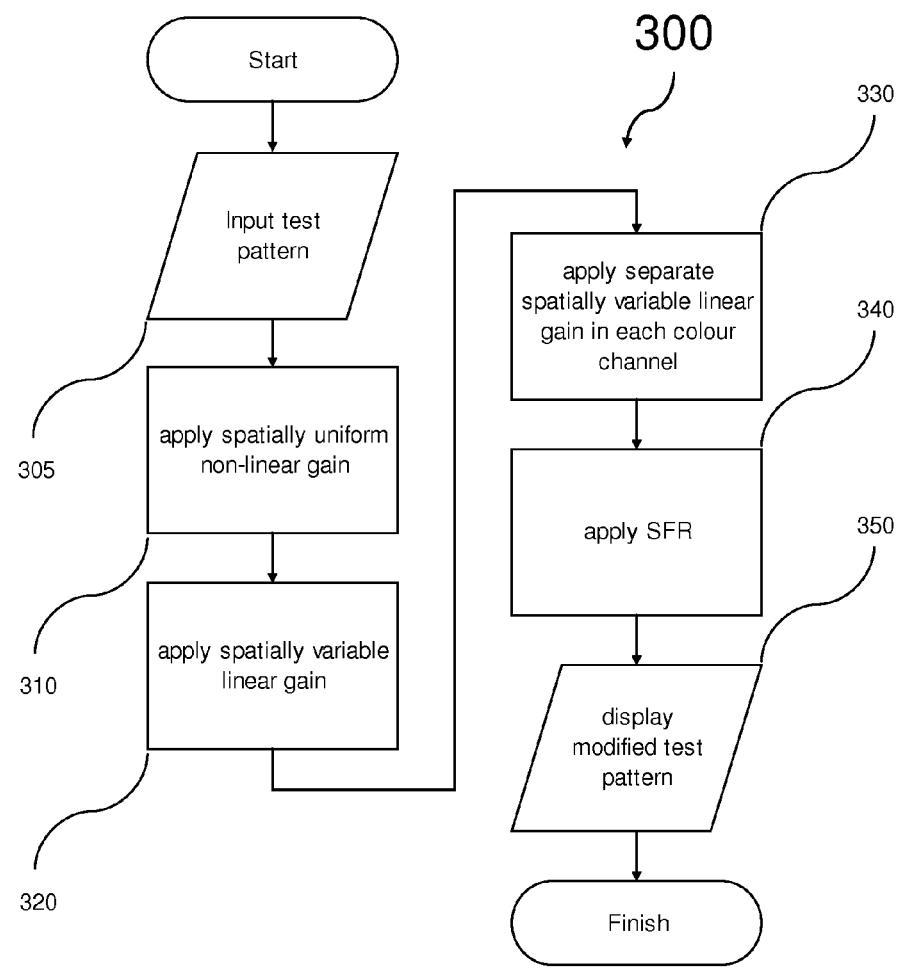
FIG. 3 is a schematic flow diagram illustrating the internal model assumed for display behaviour.

In correcting the gain defects in the test pattern display device 280 it is important to have a model of how those defects affect the displayed image, so that they may be properly measured and corrected. For the purpose of illustrating the general approach we assume that the test pattern display device 280 is well modelled by the display behaviour model 300 illustrated in FIG. 3. The exact model would vary from one display device to another depending on how the device is constructed, but it would generally be possible for an engineer to infer an appropriate model from an understanding of the functioning of the device.

It should be understood in the following description that the flow chart 300 represents a model of what is understood to be happening in the display device to produce the gain defects and SFR of the device. It may not be under the control of the engineer testing the device. The purpose of the model is twofold: (i) to enable the engineer to measure the gain defects of the device independent of the SFR; and (ii) to allow the engineer to construct a suitable pre-correction to the raw test patterns so as to remove the effects of the gain defects while leaving the SFR of the device largely unchanged, enabling the SFR to be measured in subsequent measurement steps and processing steps (120, 130, 140, 150).

The model 300 accepts the test pattern to be displayed as input 305, and in step 310 applies a non-linear gain uniformly to all spatial locations. The model 300 then in step 320 applies a multiplicative spatially variable gain factor to the image. This represents a vignetting function, where "vignetting" is a term used to describe the reduction in intensity (amplitude) near the edges of an image. In step 330, the model 300 applies a spatially variable channel gain factor to each colour channel of the image. The model 300 then imposes the spatial frequency response (SFR) at step 340 before displaying the test pattern image on the display device 280.

Guided by this model of the internal behaviour of the display device 280, measurement of the gain defects first proceeds by measuring the vignetting and channel gain (illustrated in FIG. 4), and then uses the results of that measurement to measure the display non-linearity (illustrated in FIG. 5).

The vignetting and channel gain are measured by a method 400 in which one or more spatially uniform white test patterns are displayed at step 405 on the display device 280, and which are captured at step 410 by the image capture device 290. The method 400 is desirably implemented as an application program stored as software in the HDD 210 and executable by the processor 205 to output displayable pixel data for reproduction by the display 280 of the system 299. In step 415, the input images are registered to the captured images so that the effect of the vignetting and the channel gain can be identified with a particular position on the display 280. The recorded intensity at each pixel, averaged over all channels and normalized by the input intensity, is then calculated at step 420 by the processor 205 as a spatially variable vignette factor map which is output for storage, in the HDD 210, at step 430 for later use. The processor 205 then determines at step 440 the ratio of the recorded intensity for each channel of each pixel, normalized by the input intensity and divided by the vignette factor at each pixel, which is then also output for saving at step 450, in the HDD 210 for example, for later use.

For most electronic or optical systems, the relationship between input and output signals is not perfectly linear. This is called system non-linearity or system Gamma, where the name 'Gamma' comes from the exponential variable in the voltage-current relationship in a cathode ray tube display. System Gamma is important because it causes a linear input signal to become non-linear. For a sine input, system Gamma can deform the sine wave and create harmonics, which change the frequency components of the signal.

Figure 5A:
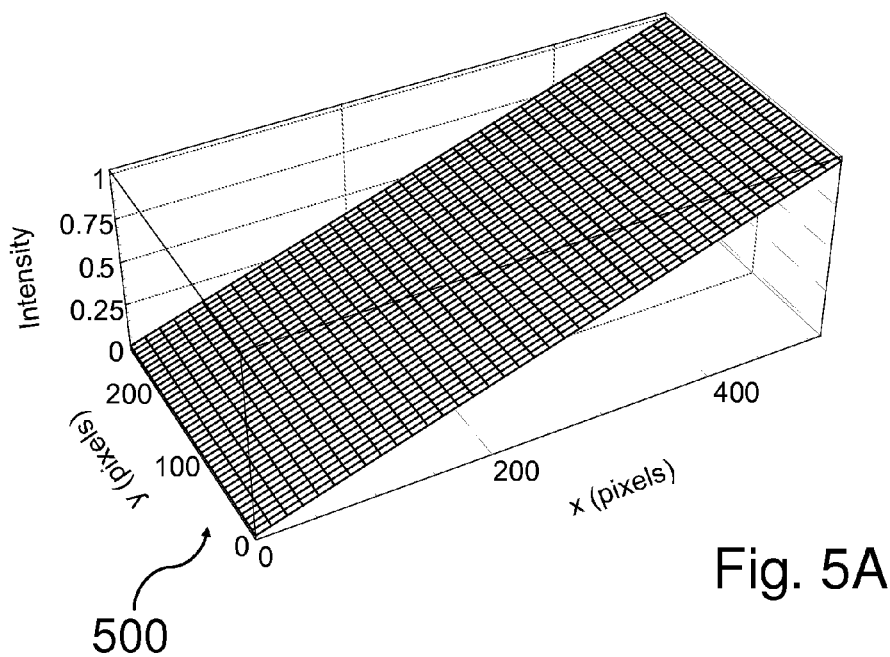
FIG. 5A illustrates the intensity profile of the linear spatial ramp test pattern used for measuring the display non-linearity.
Figure 5B:
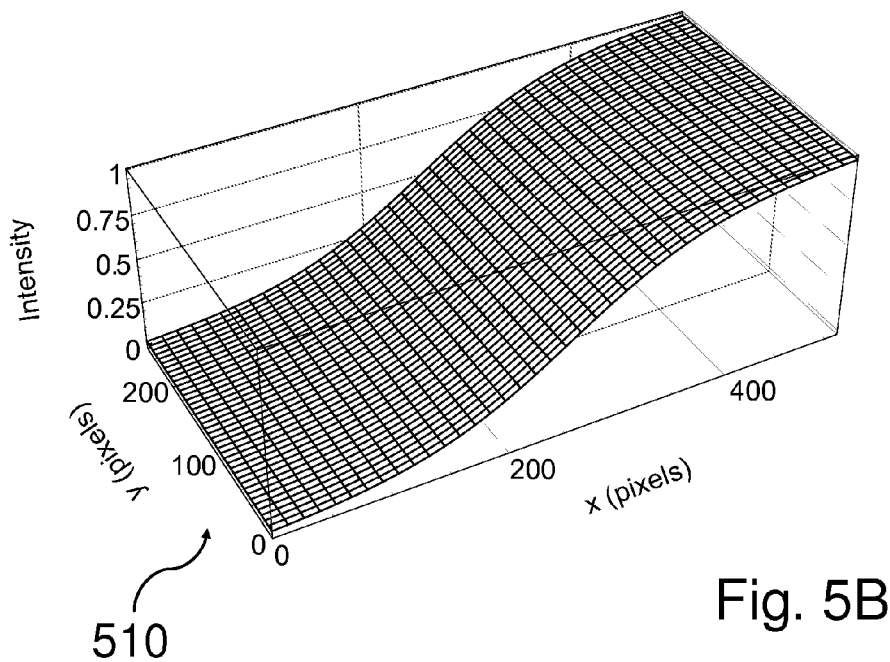
FIG. 5B illustrates a typical profile of the corresponding displayed intensity.
Figure 6A:
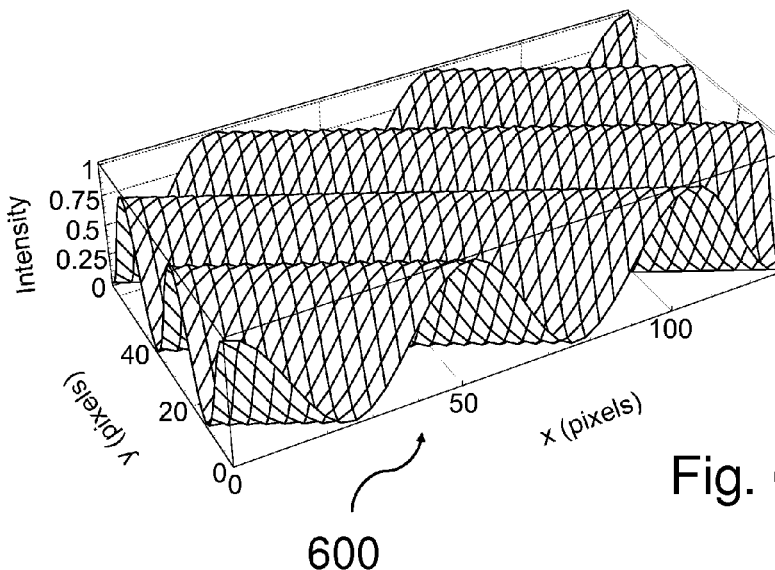
FIG. 6A illustrates an intensity profile of a typical sinusoidal test pattern.
Figure 6B:
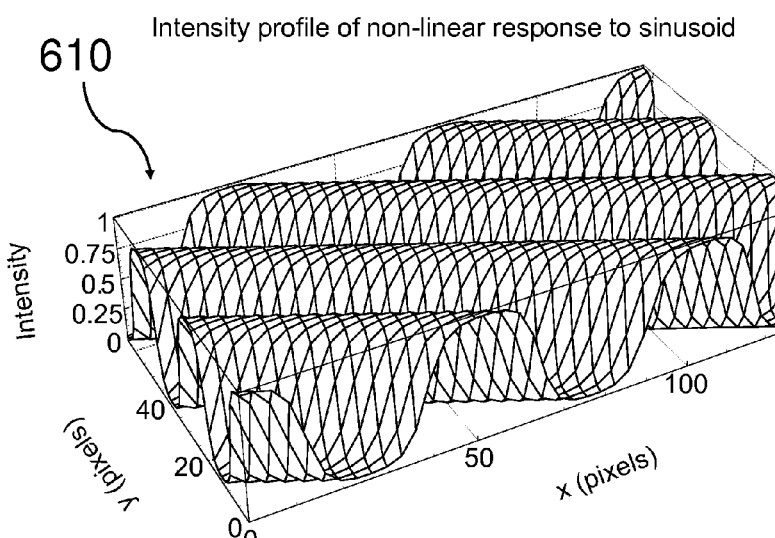
FIG. 6B illustrates the intensity profile of a typical sinusoidal test pattern after being affected by the display non-linearity.

In the display 280, the effect of the non-linearity can be understood from its effect on simple spatially variable test patterns. FIG. 5A shows an example of the intensity profile of a spatial ramp 500 and FIG. 5B shows the corresponding profile in the captured test pattern image 510. FIG. 6A shows the effect of the non-linearity on the intensity profile of a sinusoidal test pattern 600, where it causes the tops and bottoms of the intensity profile to flatten 610, as seen in FIG. 6B.

There are many different methods for measuring system Gamma. They mainly differ in the test patterns shown on the display devices. For example, patches with different gray levels may be used to step through all display intensity levels needed. Also, full screen images can also be used to avoid the vignetting error that might occur in the patch test pattern. Alternatively, ramps or other intensity varying patterns can also be applied to achieve the measurements with fewer test patterns. Regardless of the testing methods, the result is always a transfer function describing the relationship between the output and the input of the system.

In a preferred method, system gamma is measured using test patterns which contain linear ramps. Linear ramps provide a straightforward and fast way to measure the mapping of input gray level intensity to captured grey level intensity, but since the mapping is measured at different locations on the screen for different grey scale levels, this approach necessarily assumes that the non-linearity does not vary across the screen. The method also requires registration of the input image to the captured image and compensation for the measured gain defects of the display.

Figure 7:
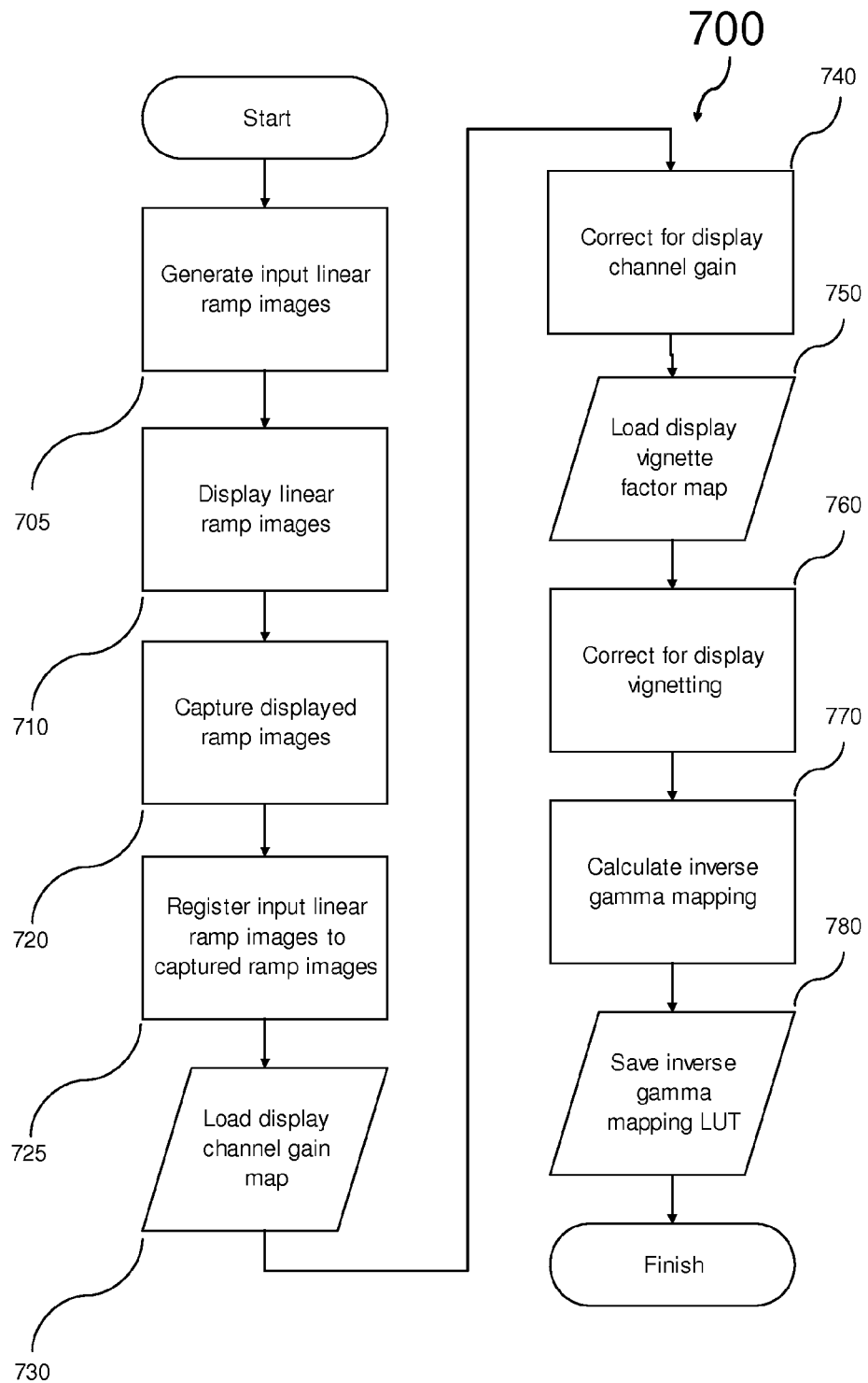
FIG. 7 is a schematic flow diagram illustrating the process used for measuring the display non-linearity.
Figure 8:
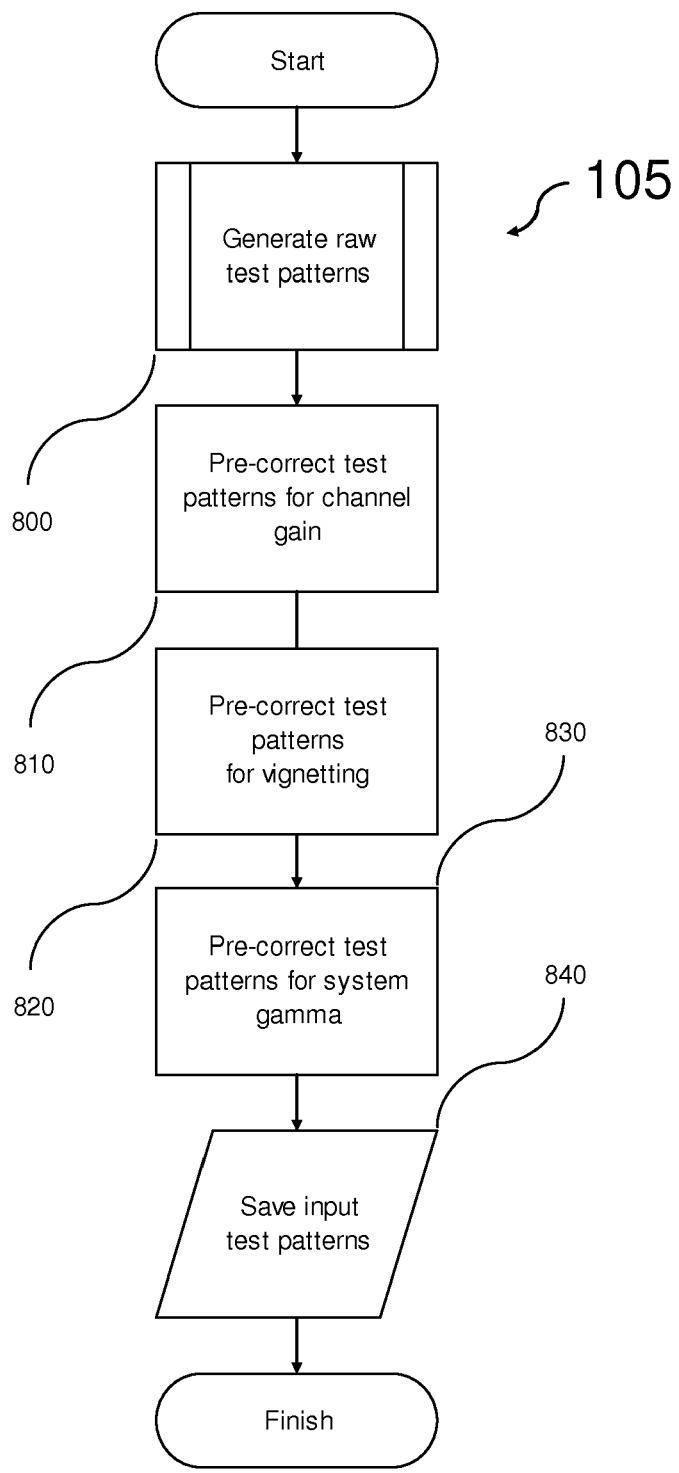
FIG. 8 is a schematic flow diagram detailing the generation of the test patterns in step 105 in FIG. 1 which are pre-corrected for gain defects.

The measurement of the display non-linearity requires the camera and display to be set up in a physical configuration like that illustrated in FIG. 2A which would preferably be the same configuration used for the measurement of the gain defects and the later measurement of the SFR. The measurement of the display non-linearity is performed according to a method 700 which is implementable as software executable by the processor 205. As seen in FIG. 7, an initial step 705 generates one or more linear spatial ramp images, which are displayed at step 710 on the display device 280 and captured at step 720 by the image capture device 290. At step 725, the input linear ramp images are registered with to the captured linear ramp images so that the geometric mapping from any point in the input linear ramp image to the corresponding point in the captured ramp image is determined. If the physical configuration is unchanged from the measurements of vignetting and channel gain then the registration performed there could be used. The previously calculated channel gain map, determined in step 440, is retrieved from the HDD 210 and input at step 730 and used to correct for the display channel gain in step 740. The vignette factor map, previously calculated at step 420, is also retrieved from the HHD 210 and input at step 750 to correct the captured image for display vignetting in step 760. The captured image, thus corrected for vignetting and channel gain is used to construct, in step 770, a look-up table (LUT) which records the non-linear component of the mapping from the captured image intensity to the input image intensity (the inverse gamma mapping), which is saved at step 780, in the HDD 210 for example, for later use.

Figure 4:
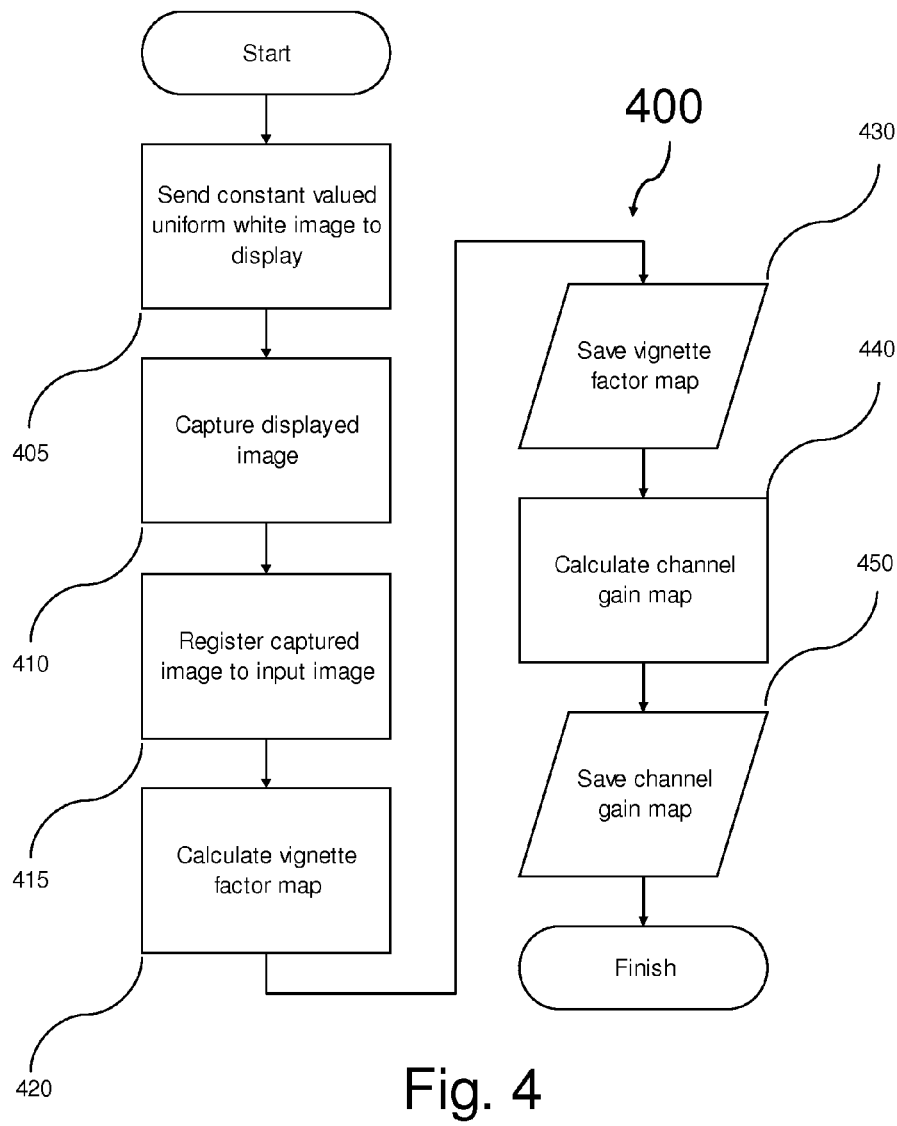
FIG. 4 is schematic flow diagram illustrating the process for measuring the display vignetting and channel gain defects.

The measured gain defect data, arising from the processes of FIGS. 4 and 7 are used in step 105 of FIG. 1 to pre-compensate the raw test pattern images to be displayed so that the displayed test patterns appear unaffected by these gain defects resulting in a displayed image affected only by the SFR. The process of step 105 is further described in detail in FIG. 8. Raw test patterns are first generated in step 800 using the computing device 200. Next, the channel gain map saved in step 450 is used in step 810 to pre-compensate for channel gain, and then the vignette map saved in step 430 is used in step 820 to pre-compensate for the vignetting. Finally the inverse gamma mapping LUT saved in step 780 is used in step 830 to pre-compensate for the display non-linearity. After this pre-compensation, the input test patterns are ready to be sent at step 840 to the display 280 for reproduction.

The intensity distribution in the raw test patterns will depend on the details of the particular implementation. Some examples of sets of the intensity distributions in test pattern images are given in FIG. 13 and FIG. 15 for two different implementations. The raw test patterns in the test pattern sequence are each formed as linear combinations of a set of sinusoidal patterns with predetermined frequencies. Each image in the sequence consists of a linear combination of one or more of these sinusoidal patterns but with changes from one image to the next in the relative phase shift and possibly also the amplitude of each of the sinusoidal patterns.

Figure 11:
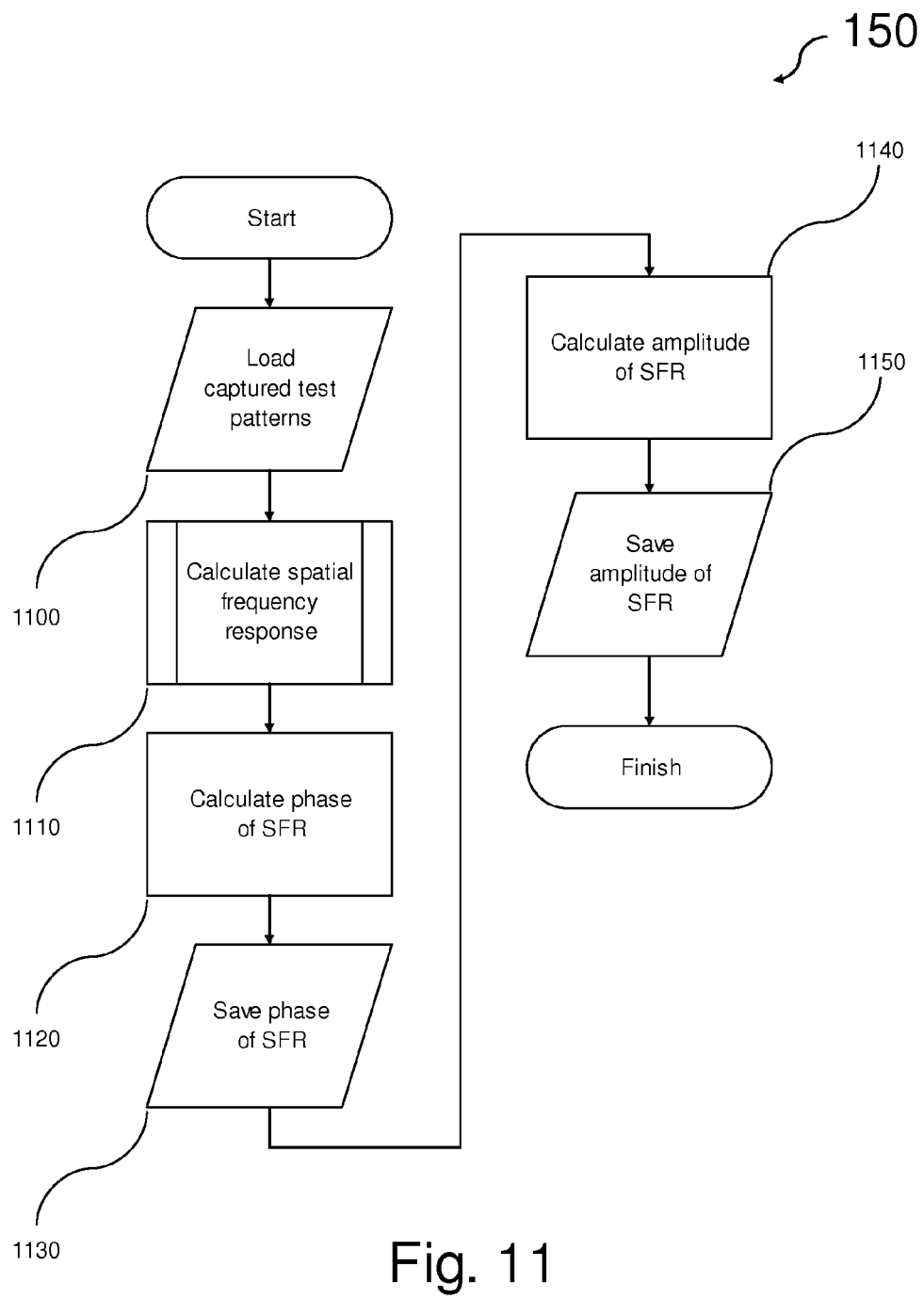
FIG. 11 is a schematic flow diagram detailing the data processing in step 150 of FIG. 1 according to one implementation of SFR measurement.
Figure 12:
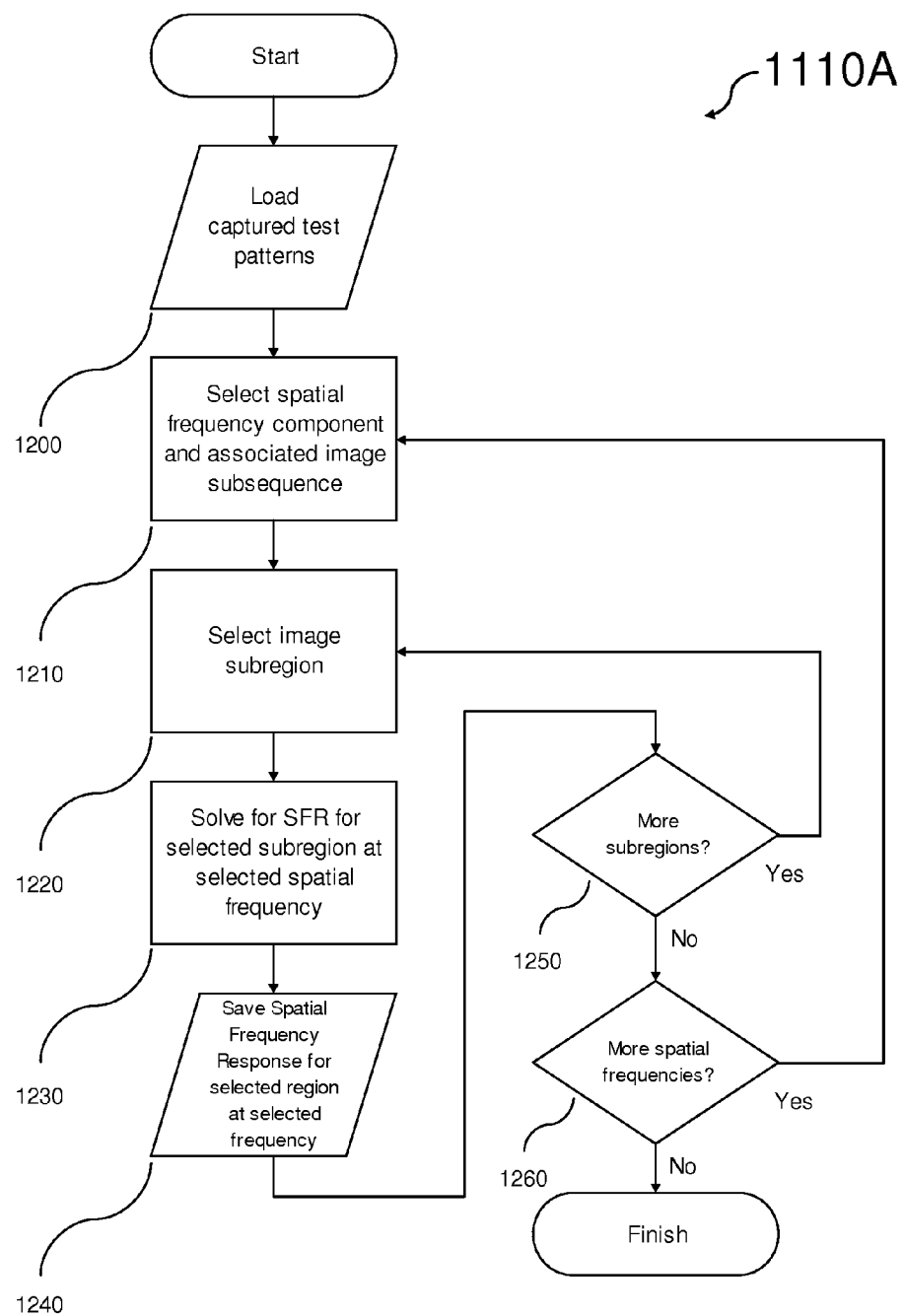
FIG. 12 is a schematic flow diagram detailing the procedure used in step 1110 of FIG. 11 for calculating the spatial frequency response according to an implementation that uses single-frequency phase shifting
Figure 14:
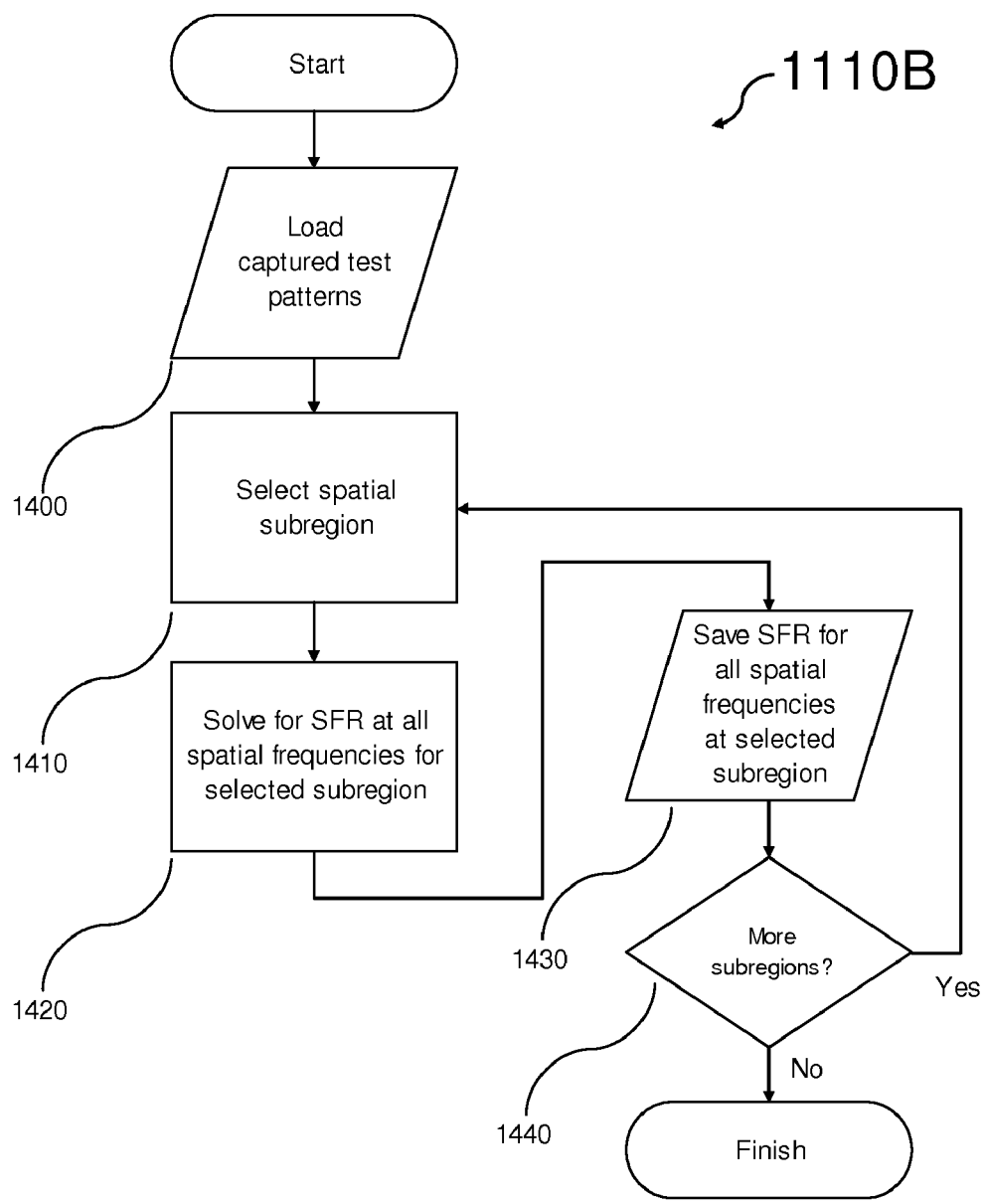
FIG. 14 is a schematic flow diagram detailing the procedure used in step 1110 of FIG. 11 for calculating the spatial frequency response according to an implementation that uses multi-frequency phase shifting.

The captured test patterns, acquired at step 120, by the image capture device 290, are used to determine the SFR in accordance with step 150 and detailed in FIGS. 11, 12 and 14. The sequence of captured test patterns may exhibit changes in the local phase and amplitudes of the sinusoids components. An analysis of these changes is what is used to determine the SFR.

Firstly described is a general implementation of the method and the associated raw test pattern construction and analysis of the captured test pattern sequences. This is followed by a description of some more specialized implementations and the associated raw test pattern construction and captured test pattern analysis. In the general description and in the specialized implementations, the method returns a measure of the SFR for a single spatially localized region of the test patterns and for one or more spatial frequencies. The complete SFR is determined by repeating the process for a range of spatial locations, $\rho_m$, sufficient to capture the spatial variation in the SFR. If more spatial frequencies are required to fully characterise the spectral variation of the SFR of the display device the process is repeated for one or more further spatial frequencies.

The image capture process 120 produces a sequence of captured test patterns which are registered in the computer 200 at step 130 through a geometric transformation so that sample points in the raw test patterns correspond to sample points in the captured test patterns. This registration process may be as simple as aligning the camera 290 so that the image of the display 280 falls approximately in the centre of the field of the camera 290 and approximately fills the camera's field. The boundaries of the display captured test pattern can be used as reference points for the registration process. Provided changes in the SFR occur over a distance on the display 280 larger than the registration error resulting from this alignment process, a reliable and accurate SFR determination can be made. If the distance over which the SFR of the display 280 changes is smaller than the registration error, or the parameters of the input test pattern vary over distances smaller than the registration error then it may be necessary to incorporate some form of alignment features in the test patterns to improve registration between the input raw test patterns and captured test patterns.

The images of the displayed test patterns, captured by the camera 290, are stored in the computer 200 and then processed, according to an application, typically stored in the HDD 210, executed by the processor 205. This may involve using the local memory 206 as intermediate storage. The processing is typically performed on one or more intensity values of the displayed and captured pixels. That value may be a single color channel (Red, Green, or Blue), a combined value (e.g. R+G+B), or a luminance value. The description provided below is applicable to the independent processing of each color channel or to the processing of some combined signal drawn from a combination of the color channels after appropriate correction for channel gain defects.

In all implementations, the components in each raw test pattern are drawn from a set of pure sinusoidal components labelled n=1 ... N, having spatial frequencies V, with each test pattern containing one or more of these pure sinusoidal components. For the analysis, each captured test pattern in the sequence is considered as a set of spatially local regions each centred around one of a number of locations $\rho_m$ (m=1 ... M). Since the analysis proceeds independently for each spatially local region, all of the parameters in the analysis can vary from one spatially local region to another and as such should be understood to have an implicit subscript index m. For the sake of readability, this index is omitted. Analysis proceeds by sampling the intensity at a set of spatial locations, $r_k$ (k=1 ... K) distributed across the spatially local area centred at a selected location $\rho_m$. Samples from the same set of spatial locations are taken in each of the test patterns in the sequence labelled j=1 ... J.

Over the spatially local region containing the K spatial locations, the background intensity in the raw test patterns is known and within some tolerance is the same for each of the K spatial locations but may be different for each of the J test patterns in the sequence. Similarly, over the spatial region containing the K spatial locations, the modulation amplitude of each sinusoidal component has a value which is known and, within some tolerance, is the same for each of the K spatial locations but may be different for each of the J test patterns in the sequence and may be different for each of the N spatial frequency components.

For each spatially local region, the constructed intensity $q_{j,k}$ at the location k in local region m of test pattern j in the raw test pattern sequence will have the general form $$q_{j,k} = B_j + \sum_{n=1}^{N} A_{j,n} \sin(\varphi_{j,k,n}) \qquad (1)$$

in which the phase term $$\varphi_{j,k,n} = 2\pi v_n \cdot r_k + \psi$$

contains a contribution $2\pi V_n \cdot r_k$, which is the spatially induced phase shift of the $n^{th}$ frequency component having spatial frequency $V_n$ and is the same in each test pattern in the test pattern sequence. The phase term also contains a contribution $\psi_{j,n}$, which is the imposed phase shift of the $n^{th}$ frequency component in the $j^{th}$ raw test pattern. The additive intensity $B_j$ is the background intensity in the $j^{th}$ test pattern in the sequence and the factor $A_{j,n}$ is the amplitude of the $n^{th}$ frequency component of the $j^{th}$ test pattern.

The effect of the SFR is to modify the observed intensity $p_{j,k}$ at the $k^{th}$ location of the $j^{th}$ image of the captured test pattern sequence by changing the phase and amplitude of each of the sinusoidal components and changing the additive intensity. These changes can be modelled as $$p_{j,k} = c + bB_j + \sum_{n=1}^{N} a_n A_{j,n} \sin(\phi_n + \varphi_{j,k,n}) + \varepsilon_{j,k} \qquad (2)$$

in which C is constant additive intensity, (arising, for example, from ambient light or additive offsets in the electronics of the display), b is a constant factor by which the raw background intensity $B_j$ is scaled as a result of the SFR of the display 280, $\alpha_n$ is the constant factor by which the $n^{th}$ frequency component in the raw test pattern is scaled due to the SFR of the display 280, $\phi_n$ is the phase shift relative to the phase of the $n^{th}$ frequency component in the raw test pattern due to the SFR of the display 280 and $\varepsilon_{j,k}$ is an additive noise term at the $k^{th}$ location in the $j^{th}$ captured test pattern. In all of the above the parameters pertain to the spatially local region but may vary from one spatially local region to another.

We can expand this as $$p_{j,k} = \qquad (3)$$
$$c + bB_j + \sum_{n=1}^{N} a_n A_{j,n} \sin\phi_n \sin\varphi_{j,k,n} + \sum_{n=1}^{N} a_n A_{j,n} \cos\phi_n \cos\varphi_{j,k,n} + \varepsilon_{j,k}$$

If we consider the full set of intensity measurements for all images j=1 ... J and for all locations k=1 ... K, then we can model the selected local region in the captured test pattern sequence as $$p = Ma + \varepsilon \qquad (4)$$

where $$M = \begin{bmatrix} A_{1,1}\cos(\varphi_{1,1,1}) & A_{1,1}\sin(\varphi_{1,1,1}) & \ldots & A_{1,n}\cos(\varphi_{1,1,n}) & A_{1,n}\sin(\varphi_{1,1,n}) & \ldots & A_{1,N}\cos(\varphi_{1,1,N}) & A_{1,N}\sin(\varphi_{1,1,N}) & B_1 & 1 \\ \vdots & \vdots & \vdots & \vdots & \vdots & \vdots & \vdots & \vdots & \vdots & \vdots \\ A_{j,1}\cos(\varphi_{j,k,1}) & A_{j,1}\sin(\varphi_{j,k,1}) & \ldots & A_{j,n}\cos(\varphi_{j,k,n}) & A_{j,n}\sin(\varphi_{j,k,n}) & \ldots & A_{j,N}\cos(\varphi_{j,k,N}) & A_{j,N}\sin(\varphi_{j,k,N}) & B_j & 1 \\ \vdots & \vdots & \vdots & \vdots & \vdots & \vdots & \vdots & \vdots & \vdots & \vdots \\ A_{J,1}\cos(\varphi_{J,K,1}) & A_{J,1}\sin(\varphi_{J,K,1}) & \ldots & A_{J,n}\cos(\varphi_{J,K,n}) & A_{J,n}\sin(\varphi_{J,K,n}) & \ldots & A_{J,N}\cos(\varphi_{J,K,N}) & A_{J,N}\sin(\varphi_{J,K,N}) & B_J & 1 \end{bmatrix},$$

$$a = \begin{bmatrix} \alpha_1 \\ \beta_1 \\ \vdots \\ \alpha_n \\ \beta_n \\ \vdots \\ \alpha_N \\ \beta_N \\ b \\ c \end{bmatrix}, \quad p = \begin{bmatrix} p_{1,1} \\ \vdots \\ p_{j,k} \\ \vdots \\ p_{J,K} \end{bmatrix}, \quad \varepsilon = \begin{bmatrix} \varepsilon_{1,1} \\ \vdots \\ \varepsilon_{j,k} \\ \vdots \\ \varepsilon_{J,K} \end{bmatrix}$$

and $$\alpha_n = a_n \sin(\phi_n)$$

$$\beta_n = a_n \cos(\phi_n).$$

Because the input background intensities $B_j$ and the amplitude modulations $A_{j,n}$ are known and invariant within a given test image over the local region defined by the locations of the intensity samples in the set being analysed, these values will not be affected by the SFR of the display. All of the effect of the SFR will be contained in the vector a.

If $JK >= 2N+2$, and the chosen phase shifts, $\psi_{j,n}$, amplitudes, $A_{j,n}$, and background intensities, $B_j$, result in a non-singular, well-conditioned matrix, then the resulting set of linear equations for $\alpha_n$, $\beta_n$ and b can be solved. The choice of phase shifts, $\psi_{j,n}$, is important in this process. There are many ways of choosing these phase shifts. Desirably, the phase shift of each component is chosen such that the sequence of phase shifts for each component form a linear sequence of the form $$\psi_{j,n} = \frac{2\pi j n}{N}. \tag{5}$$

If $JK > 2N+2$, a solution to Eqn. (4) can be achieved by the method of least squares. The least squares solution is obtained by solving a linear matrix equation for the vector a of the form $$M^T M a = M^T p \tag{6}$$

If $JK = 2N+2$, the Matrix M will be square and if it is invertible, then the solution to Eqn. (6) can be calculated from $$a = M^{-1} p \tag{7}$$

In either case the solution returns estimates of the parameters $\alpha_n, \beta_n$ and b and c.

The complex modulation amplitude $\mu_m$, for the selected local region centred on $\rho_m$ for each of the N spatial frequencies $v_n$ has the form:

$$\mu_m(v_n) = \frac{a_n}{b} e^{i\phi_n} = \frac{\beta_n + i\alpha_n}{b} \tag{8}$$

noting that the parameters $\alpha_n, \beta_n, \alpha_n, b$ are specific to the local region centred on $\rho_m$.

The complex modulation in the raw test patterns can be calculated, either from the raw test patterns or from the parameters used to create the raw test patterns, as:

$$\mu_m^0(v_n) = \frac{\beta_n^0 + i\alpha_n^0}{b_0} \tag{9}$$

where, again, the parameters $\beta_n^0, \alpha_n^0, b_0$, are specific to the local region centred on $\rho_m$.

The Spatial Frequency Response $R_m(v_n)$, can then be determined from $$R_m(v_n) = \frac{\mu_m(v_n)}{\mu_m^0(v_n)} \tag{10}$$

This general method can be simplified by restricting the parameters J, N, K to form the basis of a number of more specialized implementations of the method which we will now describe. Each of these specialised implementation can be implemented using computer software code recorded on the HDD 210 and executable by the processor 205 operating on captured image data from the camera 290.

In one such specialised implementation of the method, the SFR is measured independently for each spatial frequency v with an independent sequence of test patterns created using only a single spatial frequency in the test pattern sequence (N=1) while the analysis of the captured test patterns uses the image intensity at a single location $\rho_m$ (K=1). For this implementation, there must be no significant additive background term (c in Eqn. (4)) in the captured test patterns and the background term in the raw test patterns must be $B_j=1$ and the amplitude of each of the spatial frequency components in the raw test patterns must be set to $A_{j,n}=1$. The intensities at the same set of spatial locations from each of the phase shifted images are used to perform the data analysis. The present inventors have called this implementation "single-frequency single-pixel phase shifting".

In this specialised implementation of the method, Eqn. (2) simplifies so that the local intensity, $p_j$, at a given spatial location in the $j^{th}$ captured test pattern, is modelled as:

$$p_j = b + a \sin(\phi + \psi_j) + \epsilon_j \tag{11}$$

where $\phi$ is the unknown part of the phase, $\psi_j$ is the imposed phase shift in the $j^{th}$ raw test pattern, a is the amplitude of the sinusoidal component in the captured test patterns, b is the intensity offset in the captured test patterns and $\epsilon_j$ is the additive noise in the $j^{th}$ image. Because we are considering only one location and using only one spatial frequency in the raw test patterns, the unknown part of the phase, $\phi$, contains both the contribution due to the spatial frequency of the single frequency component in the raw test pattern and the phase shift due to the effects of the SFR.

The full system of equations for the spatially local region under consideration and for all test patterns in the sequence will have the same form as Eqn. (4) but now $$M = \begin{bmatrix} \cos(\psi_1) & \sin(\psi_1) & 1 \\ \vdots & \vdots & \vdots \\ \cos(\psi_j) & \sin(\psi_j) & 1 \\ \vdots & \vdots & \vdots \\ \cos(\psi_J) & \sin(\psi_J) & 1 \end{bmatrix}, a = \begin{bmatrix} \alpha \\ \beta \\ b \end{bmatrix}, p = \begin{bmatrix} p_1 \\ \vdots \\ p_j \\ \vdots \\ p_J \end{bmatrix}, \varepsilon = \begin{bmatrix} \varepsilon_1 \\ \vdots \\ \varepsilon_j \\ \vdots \\ \varepsilon_J \end{bmatrix} \quad (12)$$

and $\alpha = a\sin(\phi)$ $\beta = a\cos(\phi)$.

Provided J>=3 and the chosen phase shifts $\psi_j$ (preferably chosen using phase shifts defined by Eqn. (5)) result in a non-singular, well conditioned matrix, the resulting set of linear equations can be solved for $\alpha$, $\beta$ and b. The complex modulation is again defined in a similar manner to Eqn. (8)

$$\mu = \frac{a}{b} e^{i\phi} = \frac{\beta + i\alpha}{b} \quad (13)$$

except that now the phase $\phi$ now contains the phase due to the linear spatial phase variation of the single frequency component. However, the SFR calculates the ratio of the complex modulation in the captured test patterns sequence and the complex modulation in the captured test patterns sequence according to Eqn. (10). Provided the registration process accurately relates the coordinates in the captured test pattern sequence to the coordinates in the raw test pattern sequence, this will eliminate the phase due to the linear spatial phase variation of the single frequency component.

There is considerable freedom in the choice of both the number of test patterns in the sequence, and the set of phase shifts $\psi_j$ to be applied to each image in the sequence to be displayed, and implementations may comprise a wide range of permutations and combinations of these features. At least three images are required (i.e. J>=3) for the system of equations defined by Eqns. (4) and (12) to be solvable.

With three test patterns in the sequence (J=3), and evenly spaced incremental pre-determined phase shifts of 0, $2\pi/3$, $4\pi/3$ from the preceding image, Eqn. (4), neglecting the noise term, becomes $$\begin{bmatrix} p_1 \\ p_2 \\ p_3 \end{bmatrix} = \begin{bmatrix} 1 & 0 & 1 \\ -\frac{1}{2} & \frac{\sqrt{3}}{2} & 1 \\ -\frac{1}{2} & -\frac{\sqrt{3}}{2} & 1 \end{bmatrix} \begin{bmatrix} \alpha \\ \beta \\ b \end{bmatrix} \quad (14)$$

which can be solved exactly to give $$\begin{bmatrix} \alpha \\ \beta \\ b \end{bmatrix} = \begin{bmatrix} \frac{2}{3} & -\frac{1}{3} & -\frac{1}{3} \\ 0 & \frac{1}{\sqrt{3}} & -\frac{1}{\sqrt{3}} \\ \frac{1}{3} & \frac{1}{3} & \frac{1}{3} \end{bmatrix} \begin{bmatrix} p_1 \\ p_2 \\ p_3 \end{bmatrix} \quad (15)$$

From this and Eqn. (13), it is possible to calculate the complex modulation in terms of the measured pixel intensities as $$\mu = \frac{\beta + i\alpha}{b} = \frac{\sqrt{3}(p_2 - p_3) + i(2p_1 - p_2 - p_3)}{p_1 + p_2 + p_3} \quad (16)$$

and the complex modulation in the raw test patterns can be calculated with either the values of $\alpha$, $\beta$,b used in creating the raw test patterns or corresponding pixel intensity values from the raw test pattern sequence for the selected spatial frequency and spatial location. The ratio of the complex modulation in the captured test patterns and the complex modulation in the raw test patterns for the selected spatial frequency spatial location can then be used to calculate the SFR using Eqn. (10) as $$R = \frac{\mu}{\mu_0} \quad (17)$$

Other choices of sequences of phase shifts are also possible. For example, four evenly spaced phase shifted test patterns (J=4), with phase shifts of 0, $\pi/2$, $\pi$, $3\pi/2$ can be used for each spatial frequency, so that Eqn. (4) becomes $$\begin{bmatrix} p_1 \\ p_2 \\ p_3 \\ p_4 \end{bmatrix} = \begin{bmatrix} 1 & 0 & 1 \\ 0 & 1 & 1 \\ -1 & 0 & 1 \\ 0 & -1 & 1 \end{bmatrix} \begin{bmatrix} \alpha \\ \beta \\ b \end{bmatrix} + \begin{bmatrix} \varepsilon_1 \\ \varepsilon_2 \\ \varepsilon_3 \\ \varepsilon_4 \end{bmatrix} \quad (18)$$

which can be solved in a least squares sense using Eqn. (6) to give $$\begin{bmatrix} \alpha \\ \beta \\ b \end{bmatrix} = \begin{bmatrix} \frac{1}{2} & 0 & -\frac{1}{2} & 0 \\ 0 & \frac{1}{2} & 0 & -\frac{1}{2} \\ \frac{1}{4} & \frac{1}{4} & \frac{1}{4} & \frac{1}{4} \end{bmatrix} \begin{bmatrix} p_1 \\ p_2 \\ p_3 \\ p_4 \end{bmatrix} \quad (19)$$

The complex modulation can then be calculated in terms of the measured pixel intensities as:

$$\mu = \frac{\beta + i\alpha}{b} = \frac{(p_2 - p_4) + i(p_1 - p_3)}{p_1 + p_2 + p_3 + p_4} \quad (20)$$

and the, complex modulation in the raw test patterns can be calculated with either the values of $\alpha$, $\beta$,b used in creating the raw test patterns or pixel intensity values from the raw test pattern sequence for the selected spatial frequency and spatial location. The SFR will again be of the form in Eqn. (17)

In another specialised implementation of the method, the SFR is measured independently for each spatial frequency v with an independent sequence of test patterns created using only a spatial frequency for each test pattern sequence (N=1) but the analysis of the captured test patterns at a given spatially local area centred at a selected location $\rho_m$ uses the image intensities at multiple spatial locations (K>1) within the spatially local region over which the SFR could be considered constant. This could actually be the same sequence used in the single frequency single pixel methods described above. For this implementation, there must be no significant additive background term (c in Eqn. (4)) in the captured test patterns and the background term in the raw test patterns must be $B_j=1$ and the amplitude of each of the spatial frequency components in the raw test patterns must be set to $A_{j,n}=1$. The intensity is sampled at the same set of spatial locations from each of the test patterns in the sequence. The present inventors have called this implementation "single-frequency multi-pixel phase shifting".

Using multiple spatial locations has the advantage of reducing the noise in the measured SFR. However, because the phase of the sinusoids will vary with position in the image, it is necessary to determine the spatial frequency in order to account for the spatially induced phase shift at each location. This can be achieved by any of a number of standard means of frequency estimation. One preferred method to estimate the spatial frequency is to first measure the phase at each location using one of the single pixel implementations described above, and then to use this measurement of the phase as a function of pixel location to estimate the spatial frequency. Once the spatial frequency is known, a more accurate determination of the SFR using the intensities at multiple spatial locations is possible.

In this specialised implementation of the method, Eqn. (2) simplifies so that the captured pixel intensity $p_{j,k}$ for the $k^{th}$ pixel in the $j^{th}$ image is modelled as $$p_{j,k} = b + \alpha \sin(\phi_{j,k} + \phi) + \epsilon_{j,k} \quad (21)$$

where $\phi$ is the unknown part of the phase and $\phi_{j,k} = 2\pi v \cdot r_k + \psi_j$ is the pre-determined part of the phase consisting of the imposed phase shift $\psi_j$ in the $j^{th}$ image and the spatially induced phase shift at location $r_k$; a is the amplitude of the $n^{th}$ spatial frequency component; b is an intensity offset, and $\epsilon_{j,k}$ is the additive noise at the $k^{th}$ pixel in the $j^{th}$ image. This can be expanded to give $$p_{j,k} = b + \alpha \sin(\phi)\cos(\phi_{j,k}) + \alpha \cos(\phi)\sin(\phi_{j,k}) + \epsilon_{j,k} \quad (22)$$

The full system of equations for the spatially local region under consideration and for all test patterns in the sequence will have the same form as Eqn. (4) but now $$M = \begin{bmatrix} \cos(\varphi_{1,1}) & \sin(\varphi_{1,1}) & 1 \\ \vdots & \vdots & \vdots \\ \cos(\varphi_{j,k}) & \sin(\varphi_{j,k}) & 1 \\ \vdots & \vdots & \vdots \\ \cos(\varphi_{J,K}) & \sin(\varphi_{J,K}) & 1 \end{bmatrix}, a = \begin{bmatrix} \alpha \\ \beta \\ b \end{bmatrix} p = \begin{bmatrix} p_{1,1} \\ \vdots \\ p_{j,k} \\ \vdots \\ p_{J,K} \end{bmatrix}, \varepsilon = \begin{bmatrix} \varepsilon_{1,1} \\ \vdots \\ \varepsilon_{j,k} \\ \vdots \\ \varepsilon_{J,K} \end{bmatrix}$$

and $$\alpha = a\sin(\phi)$$

$$\beta = a\cos(\phi).$$

If JK>=3 and the chosen phase shifts $\psi_j$ (preferably chosen using phase shifts defined by Eqn. (5)) result in a non-singular, well conditioned matrix, then the resulting set of linear equations can be solved for $\alpha$, $\beta$ and b.

If JK>3, a least squares solution for a can again be obtained by solving Eqn. (6), and if JK=3, then the linear system can be solved using Eqn. (7). The complex modulation in the captured test patterns sequence is then determined in terms of the recovered parameters $\alpha$, $\beta$, b using Eqn. (13). The resulting complex modulation is interpreted as corresponding to the location $\rho_m$ around which the K intensity samples are obtained. The, complex modulation in the raw test patterns can be calculated with either the values of $\alpha$, $\beta$,b used in creating the raw test patterns or pixel intensity values from the raw test pattern sequence for the selected spatial frequency and spatial location. The SFR for the selected location at the chosen spatial frequency will again be the ratio of the complex modulation in the captured and raw test pattern sequences of the form in Eqn. (10).

In another specialised implementation of the method, the SFR is measured for multiple spatial frequencies $v_n$ (n=1 ... N, N>1) in a single set of raw test patterns, while the analysis of the captured test patterns uses the image intensity at a single location $\rho_m$ (K=1). For this implementation, there must be no significant additive background term (c in Eqn. (4)) in the captured test patterns and the background term in the raw test patterns must be $B_j=1$ and the amplitude of each of the spatial frequency components in the raw test patterns must be set to $A_{j,n}=1$. The intensities at the same set of spatial locations from each of the phase shifted images are used to perform the data analysis. The present inventors have called this implementation "multi-frequency single-pixel phase shifting".

In this specialised implementation of the method, Eqn. (2) simplifies so that the captured pixel intensity $p_j$ at the selected location $\rho_m$ in test pattern j is modelled as:

$$p_j = b + \sum_{n=1}^{N} a_n \sin(\phi_n + \psi_{j,n}) + \varepsilon_j \quad (23)$$

where $\phi_n$ is the unknown part of the phase of the $n^{th}$ spatial frequency component; $\psi_{j,n}$ is the pre-determined imposed phase shift of the $n^{th}$ frequency component in the $j^{th}$ test pattern; b is the intensity offset; $\alpha_n$ is the amplitude of the $n^{th}$ spatial frequency component and $\epsilon_j$ is the additive noise at selected location in the $j^{th}$ image. This can be expanded to give $$p_j = b + \sum_{n=1}^{N} a_n \sin(\phi_n)\cos(\psi_{j,n}) + a_n \cos(\phi_n)\sin(\psi_{j,n}) + \varepsilon_j \quad (24)$$

The full system of equations for the spatially local region under consideration and for all test patterns in the sequence will have the same form as Eqn. (4) but now $$M = \begin{bmatrix} \cos(\psi_{1,1}) & \sin(\psi_{1,1}) & \ldots & \cos(\psi_{1,n}) & \sin(\psi_{1,n}) & \ldots & \cos(\psi_{1,N}) & \sin(\psi_{1,N}) & 1 \\ \vdots & \vdots & \vdots & \vdots & \vdots & \vdots & \vdots & \vdots & \vdots \\ \cos(\psi_{j,1}) & \sin(\psi_{j,1}) & \ldots & \cos(\psi_{j,n}) & \sin(\psi_{j,n}) & \ldots & \cos(\psi_{j,N}) & \sin(\psi_{j,N}) & 1 \\ \vdots & \vdots & \vdots & \vdots & \vdots & \vdots & \vdots & \vdots & \vdots \\ \cos(\psi_{J,1}) & \sin(\psi_{J,1}) & \ldots & \cos(\psi_{J,n}) & \sin(\psi_{J,n}) & \ldots & \cos(\psi_{J,N}) & \sin(\psi_{J,N}) & 1 \end{bmatrix},$$

$$a = \begin{bmatrix} \alpha_1 \\ \beta_1 \\ \vdots \\ \alpha_n \\ \beta_n \\ \vdots \\ \alpha_N \\ \beta_N \\ b \end{bmatrix} \text{ and } p = \begin{bmatrix} p_1 \\ \vdots \\ p_j \\ \vdots \\ p_J \end{bmatrix} \varepsilon = \begin{bmatrix} \varepsilon_1 \\ \vdots \\ \varepsilon_j \\ \vdots \\ \varepsilon_J \end{bmatrix}$$

and $\alpha_n = a_n \sin(\phi_n)$ $\beta_n = a_n \cos(\phi_n)$.

If $J \geq 2N+1$ and the chosen phase shifts $\psi_{j,n}$ (preferably chosen using phase shifts defined by Eqn. (5)) result in a non-singular, well conditioned matrix, then the resulting set of linear equations can be solved for $\{\alpha_n, \beta_n\}$, b (n=1 ... N).

If $J>2N+1$, a least squares solution for a can again be obtained by solving Eqn. (6), and if $J=2N+1$, then the linear system can be solved using Eqn. (7). The complex modulation in the captured test patterns sequence is then determined in terms of the recovered parameters $\{\alpha_n, \beta_n\}$, b (n=1 ... N) using Eqn. (13). The resulting complex modulation is interpreted as corresponding to the location $\rho_m$ around which the K intensity samples are obtained. The, complex modulation in the raw test patterns can be calculated with either the values of $\{\alpha_n, \beta_n\}$, b used in creating the raw test patterns or pixel intensity values from the raw test pattern sequence for the selected spatial frequency and spatial location. The SFR for the selected location at the chosen spatial frequencies will again be the ratio of the complex modulation in the captured and raw test pattern sequences of the form in Eqn. (10).

In another specialised implementation of the method, the SFR is measured for multiple spatial frequencies $v_n$ (n=1 ... N, N>1) in a single set of raw test patterns, but the analysis of the captured test patterns at a given spatially local area centred at a selected location $\rho_m$ uses the image intensities at multiple spatial locations (K>1) within the spatially local region over which the SFR could be considered constant. This could actually be the same sequence used in the "multi-frequency single-pixel" method described above. For this implementation, there must be no significant additive background term (c in Eqn. (4)) in the captured test patterns and the background term in the raw test patterns must be set to $B_j=1$ and the amplitude of each of the spatial frequency components in the raw test patterns must be set to $A_{j,n}=1$. The intensity is sampled at the same set of spatial locations from each of the test patterns in the sequence. The present inventors have called this implementation "multi-frequency multi-pixel phase shifting".

Using multiple spatial locations has the advantage of reducing the noise in the measured SFR. However, as with the "single-frequency multi pixel" implementation, the local spatial frequency must be determined in order to account for the spatially induced phase shift at each location, which will now be different for each spatial frequency component. This can be achieved by a number of standard means of frequency estimation. One preferred method to estimate the spatial frequency is to first measure the phase at each location using the "multi-frequency single pixel" implementation described above, which will return a measurement of the phase of each of the components as a function of pixel location. These measurements can then be used to estimate the spatial frequency. Once the spatial frequency is known, a more accurate determination of the SFR using the intensities at multiple spatial locations is possible.

In this specialised implementation of the method, Eqn. (2) simplifies so that the captured pixel intensity for the $k^{th}$ spatial location in the $j^{th}$ image is modelled as $$p_{j,k} = b + \sum_{n=1}^{N} \alpha_n \sin(\phi_n + \varphi_{j,k,n}) + \varepsilon_{j,k} \quad (25)$$

where $\phi_n$ is the unknown part of the phase of the $n^{th}$ spatial frequency component and $\phi_{j,k,n} = 2\pi v_n \cdot r_k + \psi_{j,n}$ is the pre-determined part of the phase shift consisting of the imposed phase shift $\psi_{j,n}$ for the $n^{th}$ spatial frequency $v_n$ in the $j^{th}$ image and the phase due to the spatially induced phase shift of that frequency component at location $r_k$; $a_n$ is the amplitude of the $n^{th}$ spatial frequency component; b is an intensity offset, and $\varepsilon_{j,k}$ is the additive noise at the $k^{th}$ pixel in the $j^{th}$ image.

This can be expanded to give $$p_{j,k} = b + \sum_{n=1}^{N} a_n \sin(\phi_n)\cos(\varphi_{j,k,n}) + a_n \cos(\phi_n)\sin(\varphi_{j,k,n}) + \varepsilon_{j,k} \quad (26)$$

The full system of equations for the single location under consideration and for all test patterns in the sequence will have the same form as Eqn. (4), but now $$M = \begin{bmatrix} \cos(\varphi_{1,1,1}) & \sin(\varphi_{1,1,1}) & \ldots & \cos(\varphi_{1,1,n}) & \sin(\varphi_{1,1,n}) & \ldots & \cos(\varphi_{1,1,N}) & \sin(\varphi_{1,1,N}) & 1 \\ \vdots & \vdots & \vdots & \vdots & \vdots & \vdots & \vdots & \vdots & \vdots \\ \cos(\varphi_{j,k,1}) & \sin(\varphi_{j,k,1}) & \ldots & \cos(\varphi_{j,k,n}) & \sin(\varphi_{j,k,n}) & \ldots & \cos(\varphi_{j,k,N}) & \sin(\varphi_{j,k,N}) & 1 \\ \vdots & \vdots & \vdots & \vdots & \vdots & \vdots & \vdots & \vdots & \vdots \\ \cos(\varphi_{J,K,1}) & \sin(\varphi_{J,K,1}) & \ldots & \cos(\varphi_{J,K,n}) & \sin(\varphi_{J,K,n}) & \ldots & \cos(\varphi_{J,K,N}) & \sin(\varphi_{J,K,N}) & 1 \end{bmatrix},$$

$$a = \begin{bmatrix} \alpha_1 \\ \beta_1 \\ \vdots \\ \alpha_n \\ \beta_n \\ \vdots \\ \alpha_N \\ \beta_N \\ b \end{bmatrix} \quad p = \begin{bmatrix} p_{1,1} \\ \vdots \\ p_{j,k} \\ \vdots \\ p_{J,K} \end{bmatrix} \quad \varepsilon = \begin{bmatrix} \varepsilon_{1,1} \\ \vdots \\ \varepsilon_{j,k} \\ \vdots \\ \varepsilon_{J,K} \end{bmatrix}$$

and $\alpha_n = a_n \sin(\phi_n)$ $\beta_n = a_n \cos(\phi_n)$.

If JK>=2N+1 and the chosen phase shifts $\psi_{j,n}$ (preferably chosen using phase shifts defined by Eqn. (5)) result in a non-singular, well conditioned matrix, then the resulting set of linear equations can be solved for $\{\alpha_n, \beta_n\}$, b (n=1 ... N).

If JK>2N+1, a least squares solution for a can again be obtained by solving Eqn. (6), and if JK=2N+1, then the linear system can be solved using Eqn. (7). The complex modulation in the captured test patterns sequence is then determined in terms of the recovered parameters $\{\alpha_n, \beta_n\}$, b (n=1 ... N) using Eqn. (13). The resulting complex modulation is interpreted as corresponding to the location $\rho_m$ around which the K intensity samples are obtained. The, complex modulation in the raw test patterns can be calculated with either the values of $\{\alpha_n, \beta_n\}$, b used in creating the raw test patterns or pixel intensity values from the raw test pattern sequence for the selected spatial frequency and spatial location. The SFR for the selected location at the chosen spatial frequencies will again be the ratio of the complex modulation in the captured and raw test pattern sequences of the form in Eqn. (10).

In another specialised implementation of the method, the SFR is measured for multiple spatial frequencies $v_n$ (n=1 ... N, N>1) in a set of raw test patterns, while the analysis of the captured test patterns uses the image intensity at a single location $\rho_m$ (K=1). This implementation allows for the effects of ambient light and it allows the background intensity term and the amplitude modulation of each sinusoidal component in the raw test patterns to be independently scaled in the captured test patterns by the effects of the SFR. The intensities at the same spatial location from each of the phase shifted images are used in the data analysis. The present inventors have called this implementation "multi-frequency, single-pixel phase and amplitude shifting".

The local intensity at location $\rho_m$ in the captured image j is modelled as:

$$p_j = c + bB_j + \sum_{n=1}^{N} a_n A_{j,n} \sin(\phi_n + \psi_{j,n}) \quad (27)$$

where c is an additive background intensity term (such as ambient background light or electronic offset in the image sensor), $B_j$ is an imposed background amplitude added to each image in the sequence, b is the multiplicative intensity scaling, $A_{j,n}$ is the input amplitude of the $n^{th}$ frequency component in the $j^{th}$ image, $a_n$ is the amplitude modulation factor for the $n^{th}$ spatial frequency component, $\phi_n$ is the unknown part of the phase for the $n^{th}$ spatial frequency $v_n$ and $\psi_{j,n}$ is the pre-determined phase shift for the $n^{th}$ spatial frequency component in the $j^{th}$ image. This can be expanded as $$p_j = c + bB_j + \sum_{n=1}^{N} a_n A_{j,n} \sin(\phi_n)\cos(\psi_{j,n}) + a_n A_{j,n} \cos(\phi_n)\sin(\psi_{j,n}) \quad (28)$$

The full system of equations for the single location under consideration and for all test patterns in the sequence will have the same form as Eqn. (4), but now $$M = \begin{bmatrix} A_{1,1}\cos(\psi_{1,1}) & A_{1,1}\sin(\psi_{1,1}) & \ldots & A_{1,n}\cos(\psi_{1,n}) & A_{1,n}\sin(\psi_{1,n}) & \ldots & A_{1,N}\cos(\psi_{1,N}) & A_{1,N}\sin(\psi_{1,N}) & B_1 & 1 \\ \vdots & \vdots & \vdots & \vdots & \vdots & \vdots & \vdots & \vdots & \vdots & \vdots \\ A_{j,1}\cos(\psi_{j,1}) & A_{j,1}\sin(\psi_{j,1}) & \ldots & A_{j,n}\cos(\psi_{j,n}) & A_{j,n}\sin(\psi_{j,n}) & \ldots & A_{j,N}\cos(\psi_{j,N}) & A_{j,N}\sin(\psi_{j,N}) & B_j & 1 \\ \vdots & \vdots & \vdots & \vdots & \vdots & \vdots & \vdots & \vdots & \vdots & \vdots \\ A_{J,1}\cos(\psi_{J,1}) & A_{J,1}\sin(\psi_{J,1}) & \ldots & A_{J,n}\cos(\psi_{J,n}) & A_{J,n}\sin(\psi_{J,n}) & \ldots & A_{J,N}\cos(\psi_{J,N}) & A_{J,N}\sin(\psi_{J,N}) & B_j & 1 \end{bmatrix},$$

-continued $$a = \begin{bmatrix} \alpha_1 \\ \beta_1 \\ \vdots \\ \alpha_n \\ \beta_n \\ \vdots \\ \alpha_N \\ \beta_N \\ b \\ c \end{bmatrix}, \quad p = \begin{bmatrix} p_1 \\ \vdots \\ p_j \\ \vdots \\ p_J \end{bmatrix}, \quad \varepsilon = \begin{bmatrix} \varepsilon_1 \\ \vdots \\ \varepsilon_j \\ \vdots \\ \varepsilon_J \end{bmatrix}$$

and $\alpha_n = a_n \sin(\phi_n)$ $\beta_n = a_n \cos(\phi_n)$

If J>=2N+2, and the chosen values of the phase shifts $\psi_{j,n}$, the amplitudes $A_{j,n}$ and the offsets $B_j$ result in a non-singular, well-conditioned matrix, then the resulting set of linear equations can be solved for $\alpha_n$, $\beta_n$ and b and c.

If J>2N+2, a least squares solution for a can again be obtained by solving Eqn. (6), and if J=2N+2, then the linear system can be solved using Eqn. (7). The complex modulation in the captured test patterns sequence is then determined in terms of the recovered parameters $\{\alpha_n, \beta_n\}$, b (n=1 ... N) using Eqn. (13). The resulting complex modulation is interpreted as corresponding to the location $\rho_m$ around which the K intensity samples are obtained. The, complex modulation in the raw test patterns can be calculated with either the values of $\{\alpha_n, \beta_n\}$, b used in creating the raw test patterns or pixel intensity values from the raw test pattern sequence for the selected spatial frequency and spatial location. The SFR for the selected location at the chosen spatial frequencies will again be the ratio of the complex modulation in the captured and raw test pattern sequences of the form in Eqn. (10).

The process used in generating the raw test patterns in step 800 (FIG. 8) will depend on whether the test patterns are single-frequency or multi frequency test patterns. In both cases, it is desired to measure the SFR over a range of spatial frequencies for a range of spatial locations on the display device. However in the single-frequency case the test patterns will contain only one spatial frequency at a time, whereas for the multi-frequency test patterns, all of the spatial frequencies being tested are in each test pattern.

Figure 9:
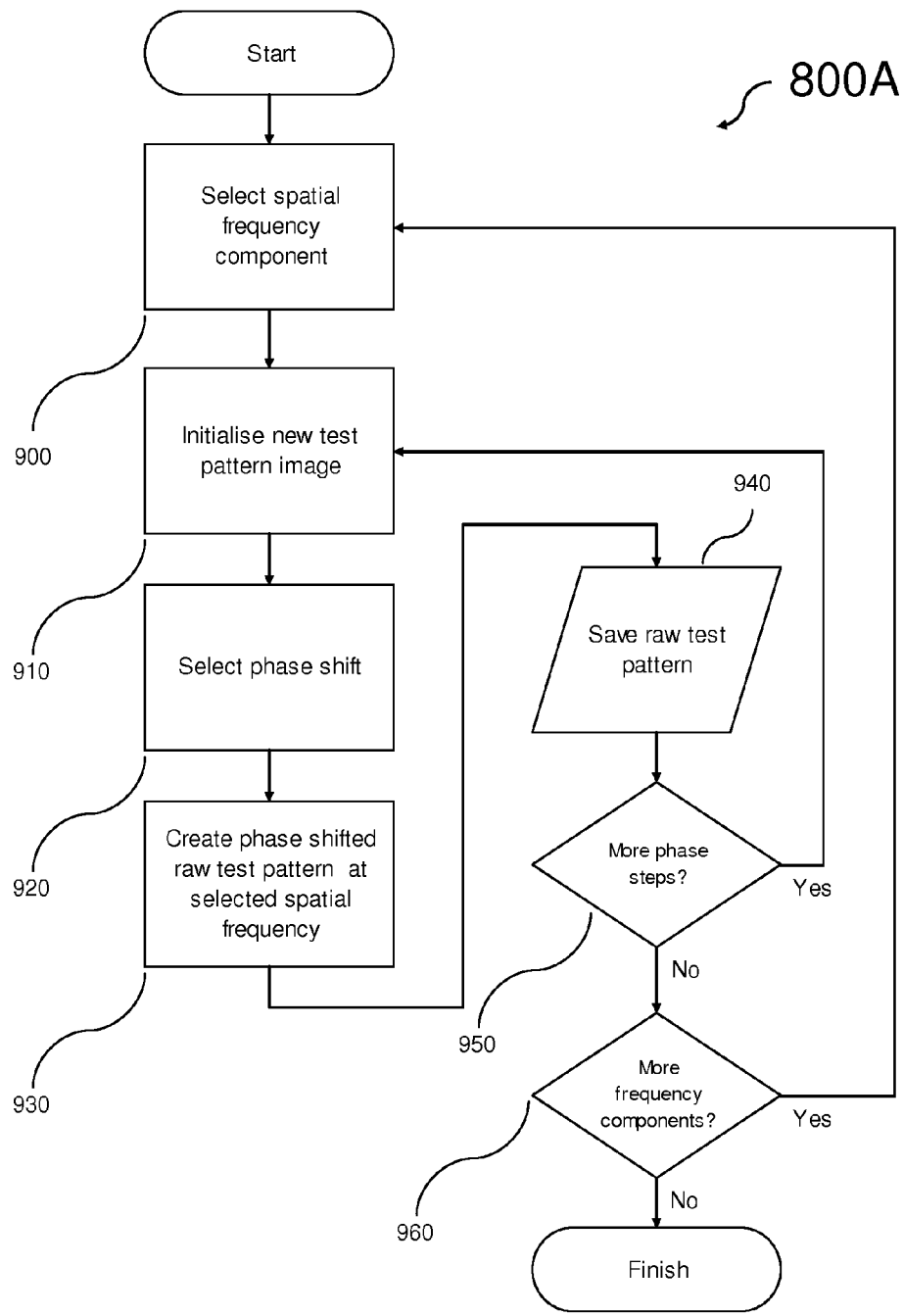
FIG. 9 is a schematic flow diagram detailing the generation of the raw test patterns in step 800 in FIG. 8 for an implementation which uses single-frequency phase shifting

For single-frequency test patterns, a process 800A for generating the raw test patterns is described in detail in FIG. 9. The process 800A can be implemented using computer software code recorded on the HDD 210 and executable by the processor 205 operating on captured image data from the camera 290. The process 800A starts by selecting one of the spatial frequencies of interest at step 900, then initialising the test pattern image at step 910 and selecting one of a series of phase shifts at step 920. The process 800A then generates at step 930 a complete test pattern for the selected frequency and phase shift 930 and outputs that test pattern at step 940. Step 950 then tests if a further phase step is to be performed for the selected frequency. If so, the process 800A returns to step 910. Once all phase patterns for the selected spatial frequency have been generated, control proceeds to step 960 which tests for remaining frequency components, returning control to step 900 to select a new frequency and for which a new test pattern is initialised at step 910 and the next phase shift is selected at step 920 and used to generate the next test pattern at step 930. When test pattern images for all of the phase shifts for all spatial frequencies have been generated, the process 800A is complete.

Figure 10:
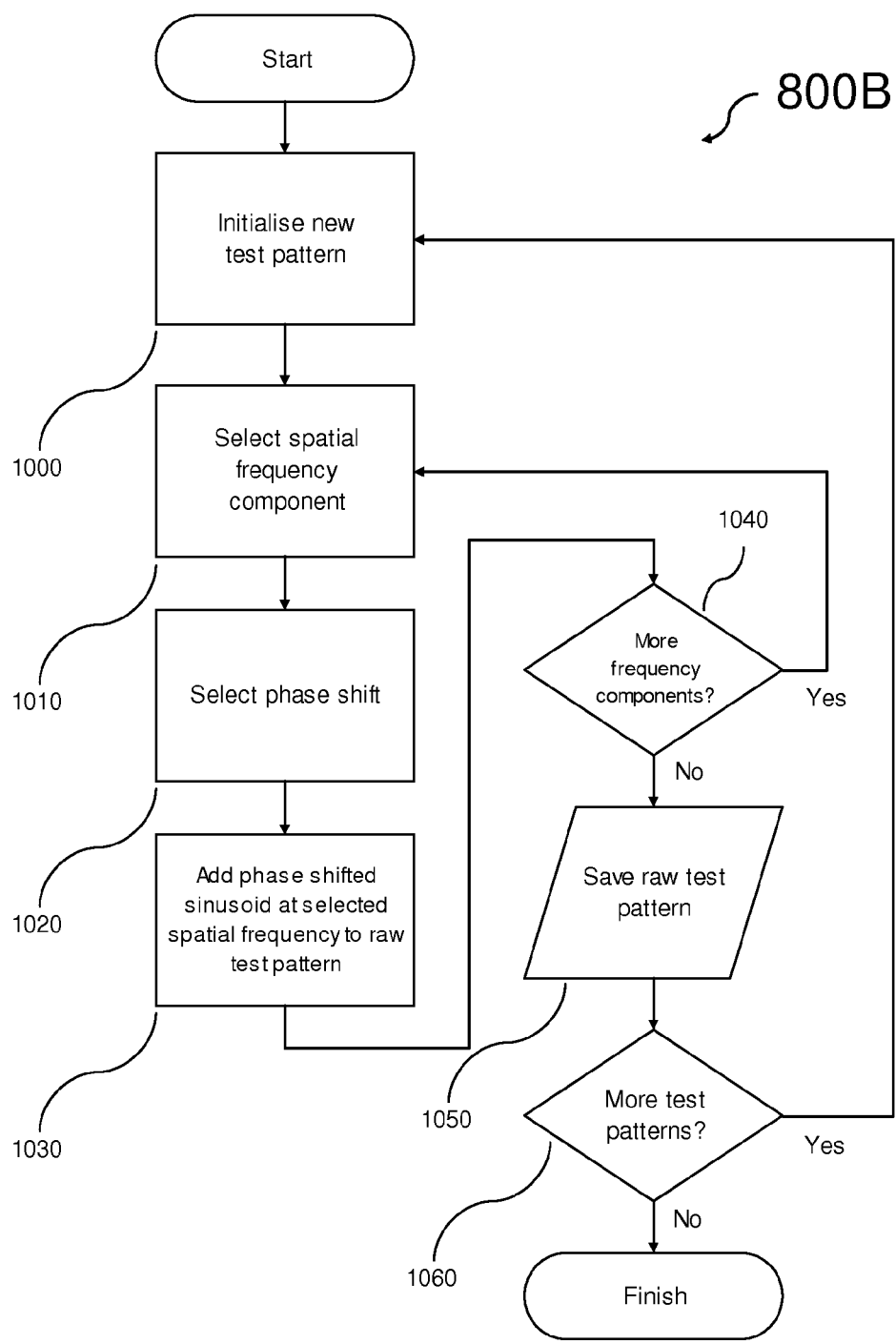
FIG. 10 is a schematic flow diagram detailing the generation of the raw test patterns in step 800 in FIG. 8 for an implementation which uses multi-frequency phase shifting.

For multi-frequency test patterns, a process 800B is described in detail in FIG. 10. The process 800B may be similarly executable in software and starts by initialising the test pattern image at step 1000 and then selecting one of the spatial frequencies of interest at step 1010. One of a series of phase shifts is selected at step 1020 and then used to generate a shifted sinusoidal pattern which is added to the current test pattern image at step 1030. The process 800B then tests at step 1040 whether more frequency components are to be used and if so returns to step 1010 to continue selecting frequency components and adding them with appropriate phase shifts until sinusoidal patterns for all of the required frequency components have been added to the test pattern image. The resulting image is then output at step 1050. If more test patterns are required to complete the test pattern set, this is tested at step 1060 which returns control to step 1000 where a new test pattern is initialised 1000 and the process 800B continues until a complete set of test patterns have been generated.

The test patterns may be stored in a buffer (e.g. HDD 210) prior to output for reproduction on the display 280. Alternatively, the test patterns may be generated on-the-fly by the processor 205 and output on a pixel by pixel basis in raster scan order for display.

Detail of the data processing procedure of step 150 is described in FIG. 11. First, the registered captured test patterns received from the camera or other imaging device 290 are loaded at step 1100. The SFR is then calculated at step 1110 using the captured test patterns with an appropriate phase-shifting algorithm from the various examples described above using execution of software code. Each of the implementations has a different specialized set of equations derivable from the general set of equations described above, by imposing some constraints on parameters and possibly reinterpreting the phase terms, that must be solved depending on the various parameters, as described in the relevant sections above. Which is most appropriate will depend to a large extent on how many measurements desired to be made, and noise considerations. Using a single frequency in each test pattern requires more measurements but can be more accurate if dynamic range is a limitation in the test patterns, especially if it is possible to evaluate the test pattern with multiple samples at each location. Whichever of the implementations of the method described above is used, the result of the measurement and data processing is a sampling of the SFR for a range of frequencies and a range of locations on the screen. If the SFR is well sampled this can be used to infer (by interpolation or other means) a continuous SFR behaviour R(v,r). This SFR can be separated to produce the and the Phase Response (PR), P(v,r) at step 1120 and the Amplitude Response (AR), A(v,r) at step 1140, by the following relationship:

$$R(v,r)=A(v,r)e^{i(P(v,r))} \qquad (29)$$

The Phase Response of the display screen 280, calculated at step 1120 is saved step 1130, in the HDD 210 for example, for later use. The Amplitude Response of the display screen 280, calculated at step 1140 is saved at step 1150, in the HDD 210 for example, for later use.

For single-frequency test patterns, the analysis follows a process 1110A detailed in FIG. 12. First the captured test patterns are input at step 1200 then a spatial frequencies is chosen for analysis at step 1210 from those used in generating the test patterns at step 900. The selected spatial frequency determines the associated sequence from the captured test patterns that must be used in the analysis. The same image subregion (which may be a single pixel or a local neighbourhood of pixels over which the SFR is expected to be approximately constant) is then selected in each image in the selected sequence at step 1220. The recorded intensities in this region are then used to calculate, at step 1230, the local SFR for the selected spatial frequency, which is output at step 1240. If there are more subregions of interest, step 1250 tests for these, returning the process 1110 to step 1210. This is performed until all of the subregions of interest in the sequence of captured test patterns associated with this spatial frequency have been analysed. When the analysis is complete for all subregions for the selected spatial frequencies, if there are more spatial frequencies of interest, as tested at step 1260, then the process 1110 returns to step 1210 and is then repeated for each spatial frequency.

Figure 13:
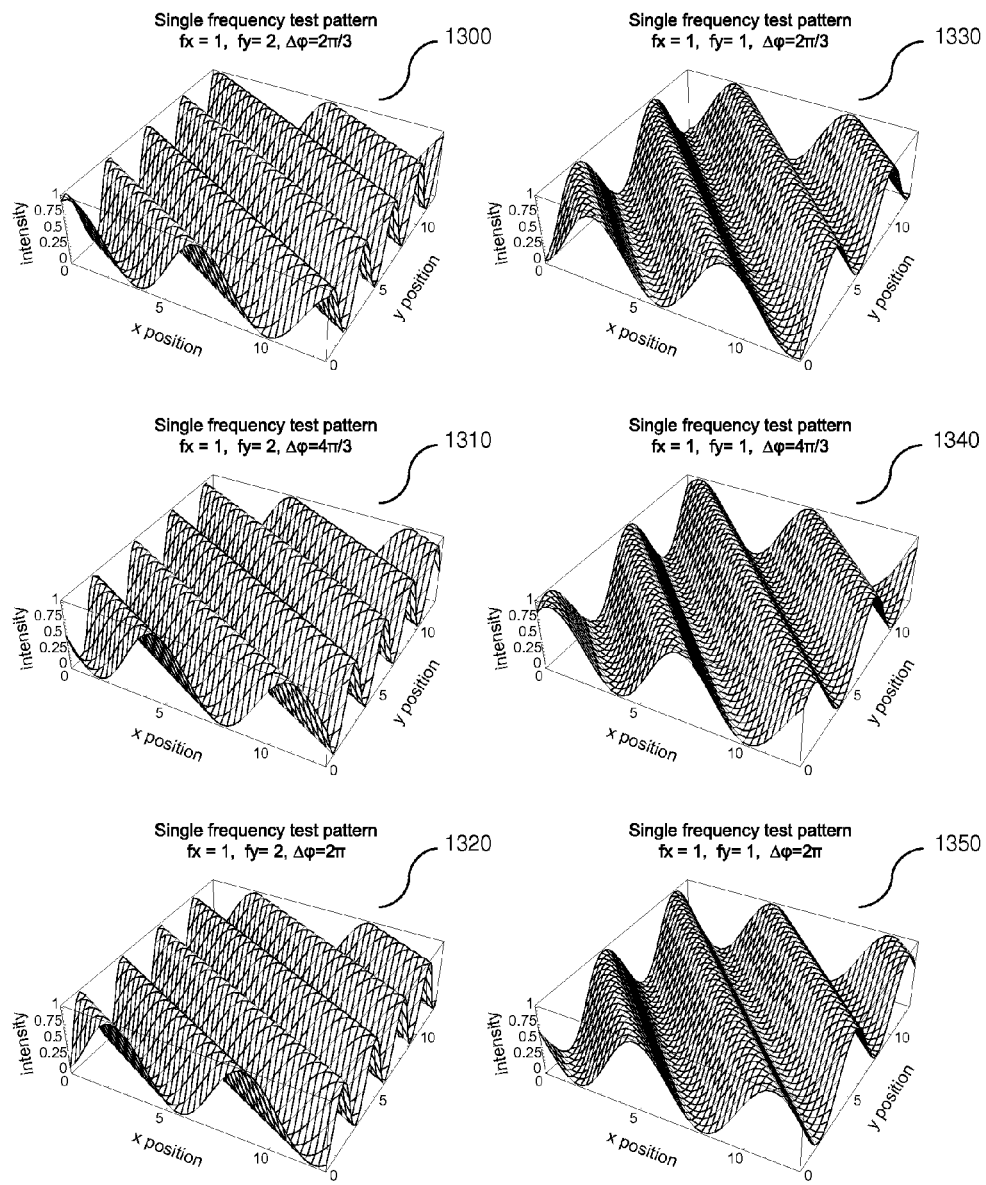
FIG. 13 illustrates the typical intensity profiles of test patterns according to an implementation that uses single-frequency phase shifting

The intensity profile over a small subregion of the test patterns from phase shifted single frequency sequences for two spatial frequencies are shown in FIG. 13. These patterns show the sinusoidal intensity profile that would be displayed in the 3-phase-shift sequence described by Eqn. (7) for a spatial frequency of (fx=1,fy=2) (phase shifts of $2\pi/3$ radians 1300, $4\pi/3$ radians 1310 and $2\pi$ radians 1320) and also for a spatial frequency of (fx=1,fy=1) and phase shifts of $2\pi/3$ radians 1330, $4\pi/3$ radians 1340, and $2\pi$ radians 1350.

For multi-frequency test patterns, the analysis follows a process 1110B detailed in FIG. 14. First the captured test patterns are input at step 1400, then the same image subregion (which may be a single pixel or a local neighbourhood of pixels over which the SFR is expected to be approximately constant) is then selected in each image in the sequence at step 1410. The recorded intensities in this spatial region are then used to calculate the local SFR for the selected spatial frequency at step 1420, which is then output at step 1430. Step 1440 determines if there are more subregions of interest, returning the process 1110B to step 1410 where the process 1110B is repeated until all of the subregions of interest in the sequence of captured test patterns have been analysed.

Figure 15:
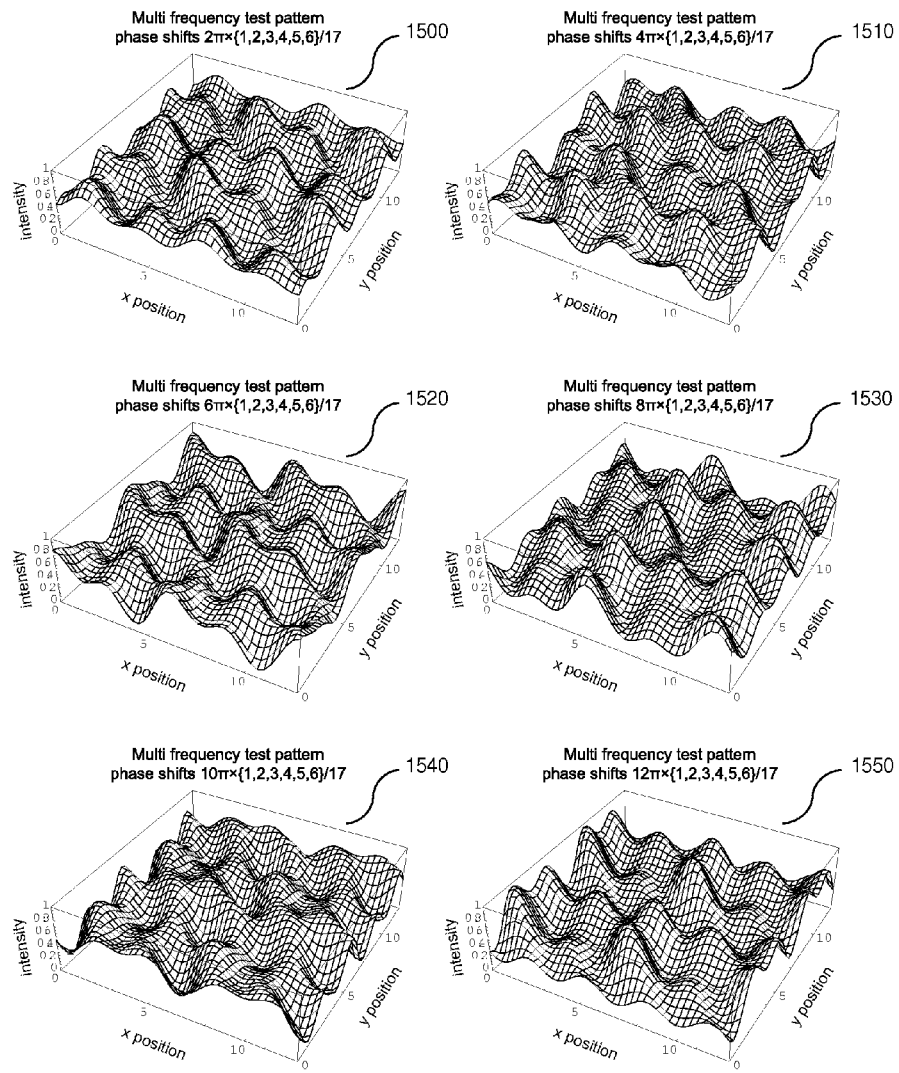
FIG. 15 illustrates the typical intensity profiles of test patterns according to an implementation that uses multi-frequency phase shifting

The intensity profile over a small subregion of the test patterns from a typical phase shifted multi-frequency sequence are shown in FIG. 15. This figure illustrates the intensity profiles of 6 test patterns from a sequence of 17 test patterns containing 8 distinct sinusoidal components. The resulting test pattern intensity profiles (1500-1505) show a more complex pattern than the single frequency patterns since each test pattern contains all 8 spatial frequency components using a different combination of phase shifts in each image.

Some of the implementations discussed above allow measurements of the SFR for a single pixel location (the single-pixel implementations), while others allow multiple spatial locations within a small region around the location to be used in calculating the SFR for a given location on the screen (the multi-pixel implementations). The single pixel implementations require more phase shifted images to be compared to achieve a given error variance in SFR for a given noise variance in the test pattern images, but offer higher spatial resolution of the SFR. The multi-pixel implementations require comparing of fewer phase shifted images to achieve the error variance in SFR for a given noise variance in the test pattern images, but do so at the cost of reducing the spatial resolution of the SFR. This ability to trade off the spatial resolution of the SFR against error variance in the SFR during the data processing stage is seen as a significant advantage of the presently disclosed arrangements over the existing art.

Ambient light falling on the display 280 can have an adverse effect on measurements. It is most desirable to remove the source of ambient light and take all measurement in a darkened environment with blackened walls. However this may not always be possible. When this is not possible, a measurement should be made of the ambient light levels by, for example, taking a image of the display 280 when it is turned off. This "ambient" test pattern image could then be subtracted from any captured test patterns to remove the effects of ambient light. It is also possible to estimate the ambient light by allowing for it in the system of equations, as is the case in the "multi-frequency, single-pixel phase and amplitude shifting" implementation described above.

In all of the arrangements and implementations described, the Spatial Frequency Response is calculated by taking the ratio of the Complex Modulation in the captured test pattern sequence to the Complex Modulation in the raw test pattern sequence. It is not intended that the present disclosure be limited to this particular measure of SFR and any other measures of the SFR based on the measured phase and amplitude of spatial frequency components in the test patterns sequence could be used.

INDUSTRIAL APPLICABILITY

The arrangements described are applicable to the computer and data processing industries and particularly for obtaining measures for the performance of optical systems including displays and imaging devices to thereby determine the performance of at least one of a display or an imaging device.

The foregoing describes only some embodiments of the present invention, and modifications and/or changes can be made thereto without departing from the scope and spirit of the invention, the embodiments being illustrative and not restrictive.

We claim:
1. A method for measuring the spatial frequency response (SFR) of an imaging system including a display device and an image capture device, said method comprising the steps of:
  displaying a sequence of displayable test pattern images on the display device, the sequence comprising at least three different test pattern images, each of the displayable test pattern images including a test pattern having at least one sinusoidal pattern at one or more spatial frequencies such that for at least one spatial frequency, the corresponding sinusoidal patterns of each of the at least three test pattern images in the sequence are, at a point common to the at least three test pattern images, shifted in phase by predetermined values relative to each other;

capturing the displayed sequence of images with the image capture device to generate a corresponding sequence of captured test pattern images; and comparing the captured test pattern images with the displayable test pattern images to calculate the SFR at a plurality of image locations in the imaging system at the one or more spatial frequencies.

2. A method according to claim 1, wherein the plurality of image locations each comprise a single pixel in the images.

3. A method according to claim 1, wherein the SFR is the optical transfer function (OTF) of the system.

4. A method according to claim 1, wherein the SFR is the modulation transfer function (MTF) of the system.

5. A method according to claim 1, where the SFR at the one or more spatial frequencies is measured for each pixel location in the images.

6. A method according to claim 1, further comprising the steps of:

measuring gain defects of the system; and correcting the displayable test pattern images to compensate for the measured gain defects.

7. A method according to claim 1, further comprising the step of:

determining a phase response of the system from the comparing of the captured test pattern images with the displayable test pattern images.

8. A method according to claim 1, wherein the at least three test pattern images comprise a first pattern image and at least two subsequent test pattern images, and the subsequent test pattern images are formed by incrementing the phases of the one or more spatial frequencies in the preceding image in the sequence by a pre-determined phase step that is different for each said spatial frequency.

9. A method of measuring the spatial frequency response (SFR) of a display device, the display device and an image capture device each forming part of an imaging system in which the image capture device has a known SFR, said method comprising the steps of:

(a) measuring the SFR of the system by:

(i) displaying a sequence of displayable test pattern images on the display device, the sequence comprising at least three different test pattern images, each of the displayable test pattern images including a test pattern having at least one sinusoidal pattern at one or more spatial frequencies such that for at least one spatial frequency, the corresponding sinusoidal patterns of each of at least the three test pattern images in the sequence are, at a point common to the at least three test pattern images, shifted in phase by predetermined values relative to each other;

(ii) capturing the displayed sequence of images with the image capture device to generate a corresponding sequence of captured test pattern images; and (iii) comparing the captured test pattern images with the displayable test pattern images to calculate the SFR at a plurality of image locations in the imaging system at the one or more spatial frequencies; and (b) determining the SFR of the display device by compensating the measured system SFR with the known SFR of the image capture device.

10. A method of measuring the spatial frequency response (SFR) of an image capture device, the image capture device and a display device each forming part of an imaging system in which the display device has a known SFR, said method comprising the steps of:

(a) measuring the SFR of the system by:

(i) displaying a sequence of displayable test pattern images on the display device, the sequence comprising at least three different test pattern images, each of the displayable test pattern images including a test pattern having at least one sinusoidal pattern at one or more spatial frequencies such that for at least one spatial frequency, the corresponding sinusoidal patterns of each of the at least three test pattern images in the sequence are, at a point common to the at least three test pattern images, shifted in phase by predetermined values relative to each other;

(ii) capturing the displayed sequence of images with the image capture device to generate a corresponding sequence of captured test pattern images; and (iii) comparing the captured test pattern images with the displayable test pattern images to calculate the SFR at a plurality of image locations in the imaging system at the one or more spatial frequencies; and (b) determining the SFR of the image capture device by compensating the measured system SFR with the known SFR of the display device.

11. A non-transitory computer readable storage medium having a program recorded thereon, the program being executable by a computer apparatus to measure the spatial frequency response (SFR) of an imaging system including a display device and an image capture device, said program comprising:

code for displaying a sequence of displayable test pattern images on the display device, the sequence comprising at least three different test pattern images, each of the displayable test pattern images including a test pattern having at least one sinusoidal pattern at one or more spatial frequencies such that for at least one spatial frequency, the corresponding sinusoidal patterns of each of the at least three test pattern images in the sequence are, at a point common to the at least three test pattern images, shifted in phase by predetermined values relative to each other;

code for capturing the displayed sequence of images with the image capture device to generate a corresponding sequence of captured test pattern images; and code for comparing the captured test pattern images with the displayable test pattern images to calculate the SFR at a plurality of image locations in the imaging system at the one or more spatial frequencies.

12. An imaging system comprising:

(a) a display device configured to display images;

(b) an image capture device configured to capture images displayed by said display device; and (c) a computer apparatus coupled to said display device and said image capture device, said computer apparatus comprising a program executable to measure the spatial frequency response (SFR) of an imaging system including the display device and the image capture device, said program executable comprising:

(1) code for displaying a sequence of displayable test pattern images on the display device, the sequence comprising at least three different test pattern images, each of the displayable test pattern images including a test pattern having at least one sinusoidal pattern at one or more spatial frequencies such that for at least one spatial frequency, the corresponding sinusoidal patterns of each of the at least three test pattern images in the sequence are, at a point common to the at least three test pattern images, shifted in phase by predetermined values relative to each other;

(2) code for capturing the displayed sequence of images with the image capture device to generate a corresponding sequence of captured test pattern images; and (3) code for comparing the captured test pattern images with the displayable test pattern images to calculate the SFR at a plurality of image locations in said imaging system at the one or more spatial frequencies.

13. A computer apparatus coupled to a display device and an image capture device, the computer apparatus comprising a program recorded on a storage medium and executable by a processor of said computer apparatus to measure the spatial frequency response (SFR) of an imaging system including the display device and the image capture device, said program comprising:

code for displaying a sequence of displayable test pattern images on the display device, the sequence comprising at least three different test pattern images, each of the displayable test pattern images including a test pattern having at least one sinusoidal pattern at one or more spatial frequencies such that for at least one spatial frequency, the corresponding sinusoidal patterns of each of the at least three test pattern images in the sequence are, at a point common to the at least three test pattern images, shifted in phase by predetermined values relative to each other;

code for capturing the displayed sequence of images with the image capture device to generate a corresponding sequence of captured test pattern images; and code for comparing the captured test pattern images with the displayable test pattern images to calculate the SFR at a plurality of image locations in the imaging system at the one or more spatial frequencies.

14. A method for measuring the spatial frequency response (SFR) of an imaging system including a display device and an image capture device, said method comprising the steps of:

displaying a sequence of displayable test pattern images on the display device, the sequence comprising at least three different test pattern images, each of the displayable test pattern images including a test pattern having at least one sinusoidal pattern at one or more spatial frequencies such that, for at least one spatial frequency, the corresponding sinusoidal patterns of each of the at least three test pattern images in the sequence are, at a point common to the at least three test pattern images, shifted in phase by predetermined values relative to each other;

capturing the displayed sequence of images with the image capture device to generate a corresponding sequence of captured test pattern images;

combining the captured test pattern images to form a combined captured test pattern image; and calculating, using the combined captured test pattern image and one or more parameters used to create the displayable test pattern images, the SFR at a plurality of image locations in the imaging system at the one or more spatial frequencies.

* * * * *